United States Patent
Dimpelfeld et al.

(10) Patent No.: US 11,459,929 B2
(45) Date of Patent: Oct. 4, 2022

(54) FLOW DIVERTER TO MITIGATE DEPOSITS IN A DOSER CONE

(71) Applicant: Faurecia Emissions Control Technologies, USA, LLC, Columbus, IN (US)

(72) Inventors: Philip M. Dimpelfeld, Columbus, IN (US); Eduardo Alano, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 830 days.

(21) Appl. No.: 16/317,856

(22) PCT Filed: Mar. 2, 2017

(86) PCT No.: PCT/US2017/020314
§ 371 (c)(1),
(2) Date: Jan. 15, 2019

(87) PCT Pub. No.: WO2018/017164
PCT Pub. Date: Jan. 25, 2018

(65) Prior Publication Data
US 2021/0285355 A1    Sep. 16, 2021

Related U.S. Application Data

(63) Continuation of application No. 15/214,509, filed on Jul. 20, 2016, now Pat. No. 10,174,658.

(51) Int. Cl.
*F01N 3/28* (2006.01)
*B01F 23/213* (2022.01)
(Continued)

(52) U.S. Cl.
CPC ........ *F01N 3/2892* (2013.01); *B01F 23/2132* (2022.01); *B01F 25/10* (2022.01);
(Continued)

(58) Field of Classification Search
CPC .. F01N 3/2892; F01N 3/2066; F01N 2610/02; F01N 2610/1453; F01N 3/208;
(Continued)

(56) References Cited

U.S. PATENT DOCUMENTS 8,387,393 B2 * 3/2013 Landry ................... F23R 3/286
60/748
8,661,792 B2 * 3/2014 Greber ................ F01N 13/0097
60/295

(Continued)

FOREIGN PATENT DOCUMENTS

CN    101624932 A    1/2010
CN    102071994 A    5/2011
(Continued)

OTHER PUBLICATIONS

First Examination Report for Indian Application No. 201917000145 dated Nov. 19, 2020.
(Continued)

*Primary Examiner* — Devon C Kramer
*Assistant Examiner* — Kelsey L Stanek
(74) *Attorney, Agent, or Firm* — Carlson, Gaskey & Olds, P.C.

(57) ABSTRACT

A mixer for a vehicle exhaust system includes a mixer housing that defines an interior cavity for engine exhaust gases, and which includes a doser opening formed within a wall of the mixer housing. A cone has a cone inlet opening aligned with the doser opening and a cone outlet into the interior cavity. A diverter has at least one first opening that is open to the interior cavity and a second opening that
(Continued)

surrounds the cone outlet. Exhaust flow is directed by the diverter to the cone inlet opening to be mixed with a fluid injected through the doser opening.

23 Claims, 17 Drawing Sheets

(51) Int. Cl.
    *B01F 25/10*     (2022.01)
    *B01F 25/314*     (2022.01)
    *F01N 3/20*     (2006.01)
    *B01F 25/00*     (2022.01)

(52) U.S. Cl.
    CPC ........ *B01F 25/3141* (2022.01); *F01N 3/2066* (2013.01); *B01F 2025/931* (2022.01); *F01N 2610/02* (2013.01); *F01N 2610/1453* (2013.01); *Y02A 50/20* (2018.01); *Y02T 10/12* (2013.01)

(58) Field of Classification Search
    CPC .............. F01N 2240/20; B01F 3/04049; B01F 5/0057; B01F 5/0473; B01F 2005/0091; B01F 5/00; B01F 5/0065; B01F 5/0074; B01F 5/0471; B01F 5/0486; B01F 5/049; B01F 2005/002; B01F 2005/0017; B01F 2005/0045; Y02A 50/20; Y02T 10/12
    USPC .......................................................... 60/301
    See application file for complete search history.

(56) References Cited

U.S. PATENT DOCUMENTS

| | | | |
|---|---|---|---|
| 10,174,658 B2* | 1/2019 | Dimpelfeld | B01F 5/0473 |
| 2011/0113759 A1* | 5/2011 | Tilinski | F01N 3/2066 60/295 |
| 2011/0308234 A1* | 12/2011 | De Rudder | B01F 5/0062 60/295 |
| 2012/0090305 A1 | 4/2012 | Floyd et al. | |
| 2012/0255287 A1 | 10/2012 | Kowada | |
| 2013/0239546 A1* | 9/2013 | Levin | B01F 5/04 60/274 |
| 2013/0333363 A1 | 12/2013 | Joshi et al. | |
| 2015/0101313 A1 | 4/2015 | Mitchell et al. | |
| 2015/0135683 A1* | 5/2015 | Petry | F01N 3/2006 60/286 |
| 2015/0198073 A1 | 7/2015 | Jujare et al. | |
| 2016/0215673 A1* | 7/2016 | Noren, IV | B01F 25/4521 |
| 2017/0082007 A1* | 3/2017 | Alano | F01N 3/2066 |
| 2018/0142597 A1 | 5/2018 | Riepshoff et al. | |

FOREIGN PATENT DOCUMENTS

| | | |
|---|---|---|
| JP | 2014234815 A1 | 12/2014 |
| KR | 20140037980 A | 3/2014 |
| WO | 2015187128 A1 | 12/2015 |
| WO | 2018017164 A1 | 1/2018 |

OTHER PUBLICATIONS

First Examination Report for Indian Application No. 201917000146 dated Nov. 9, 2020.
International Preliminary Report on Patentability for International Application No. PCT/US2017/020314 dated Jan. 31, 2019.

\* cited by examiner

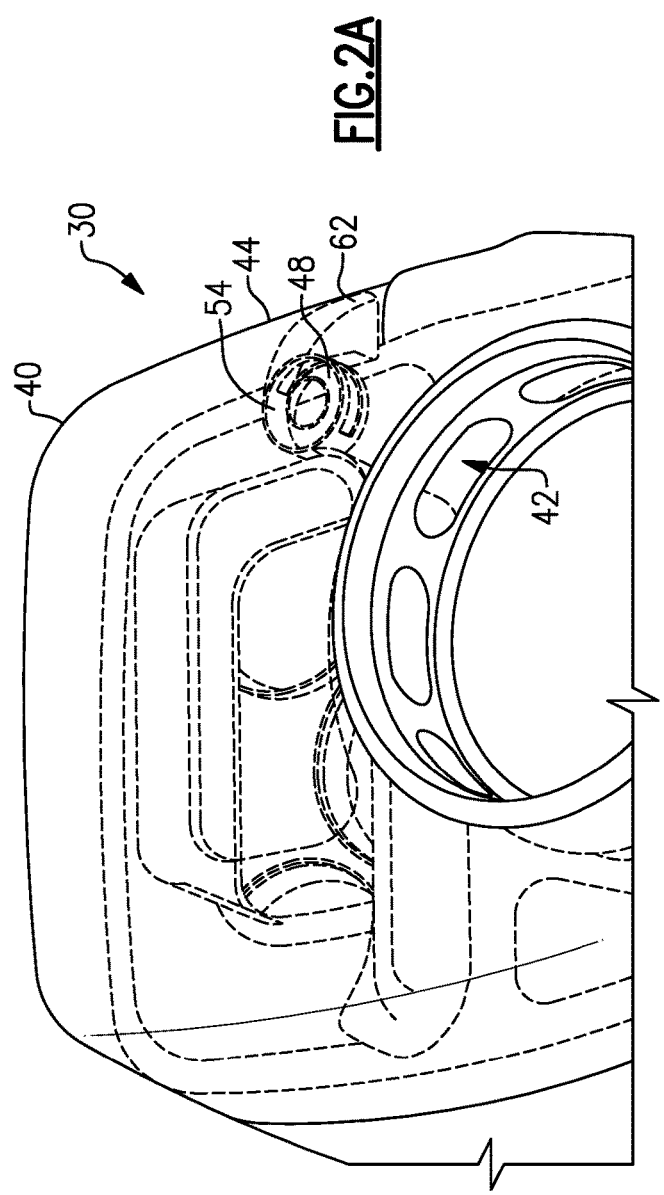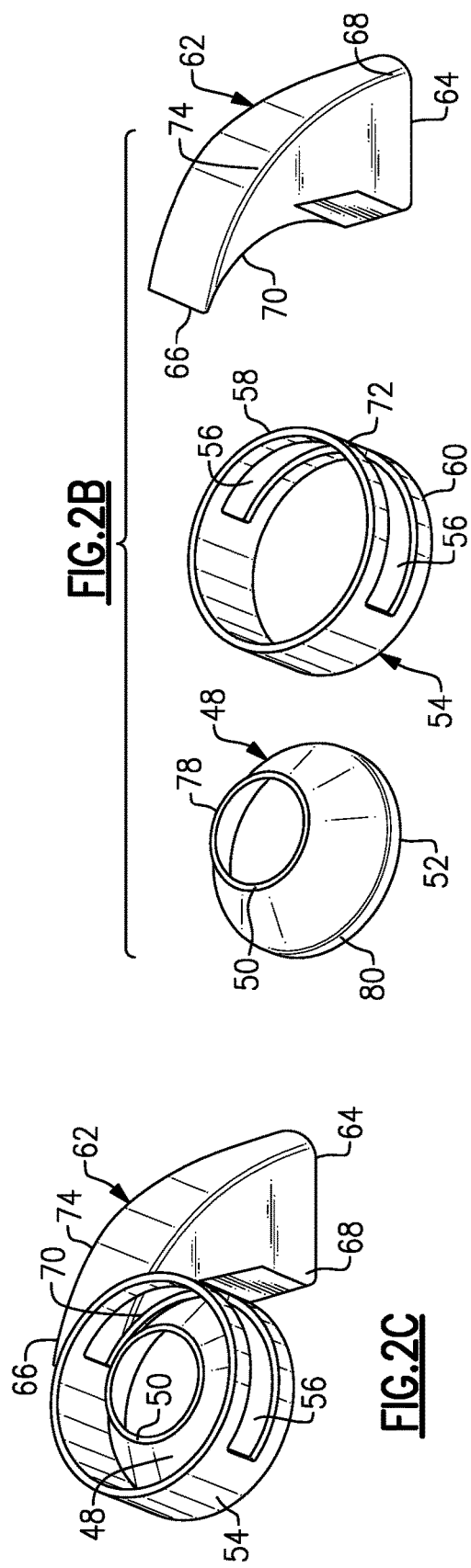

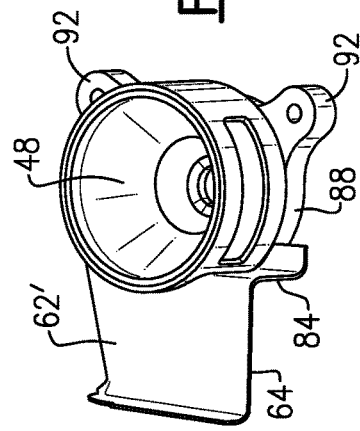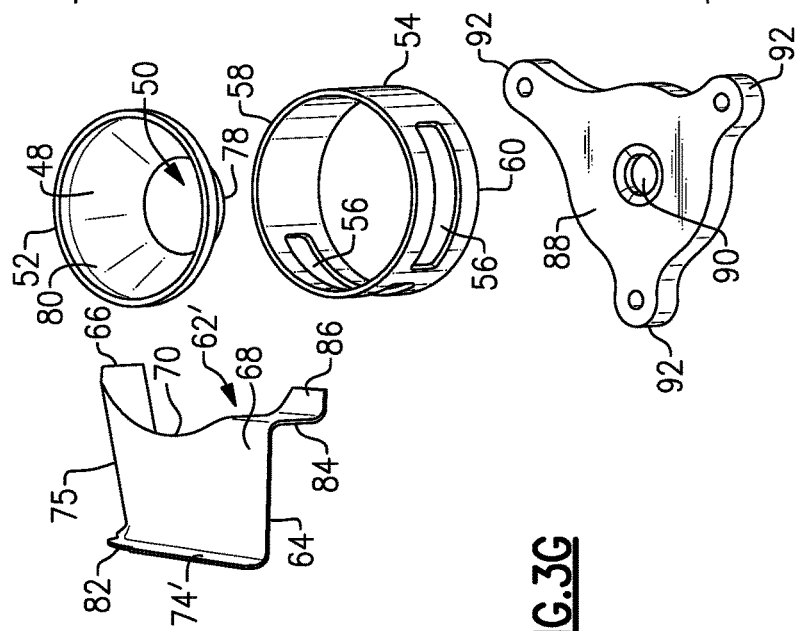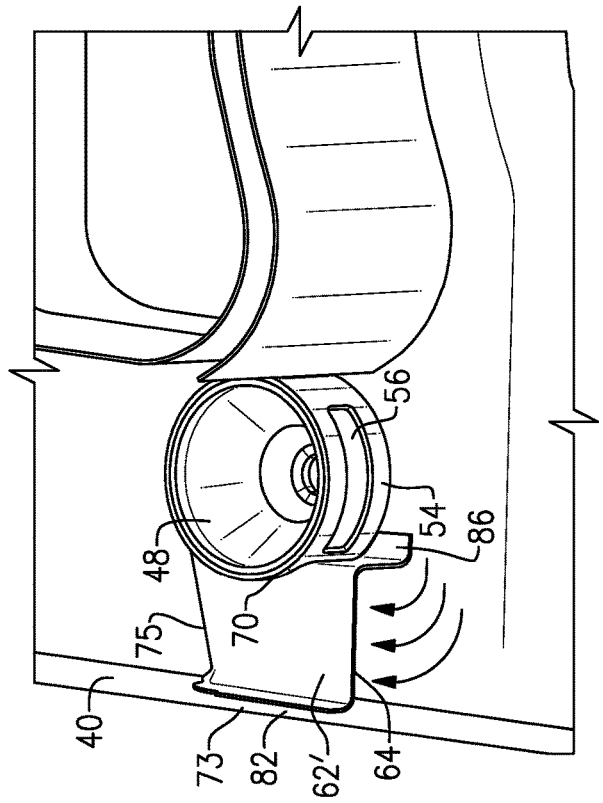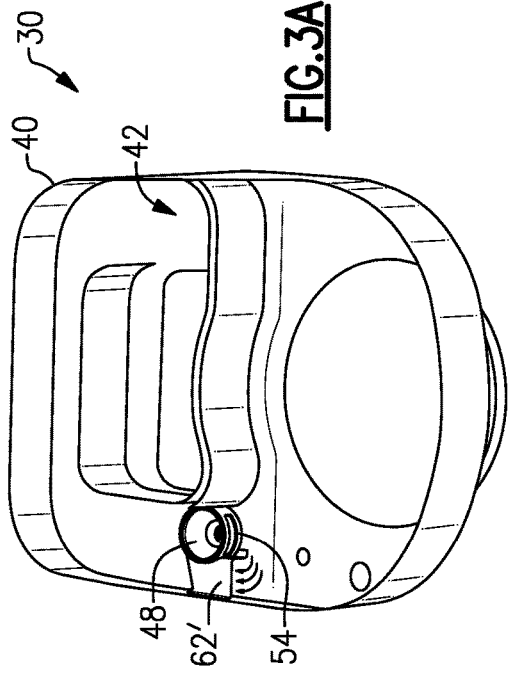

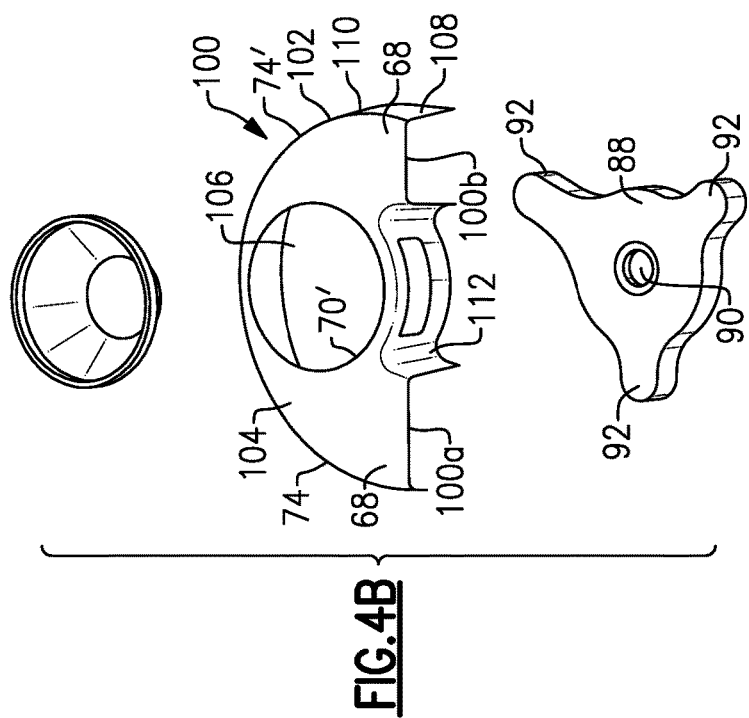
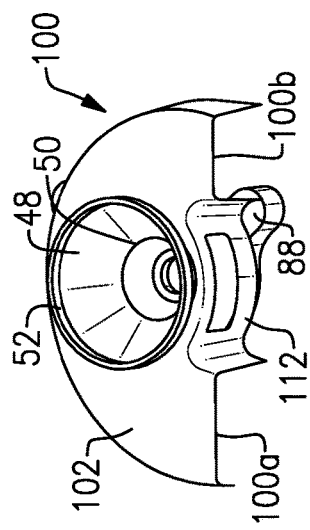
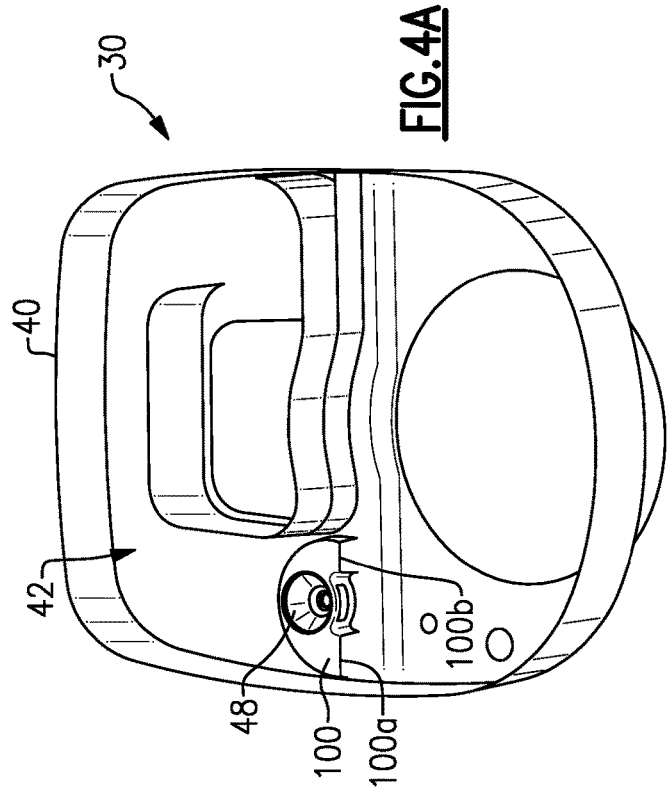

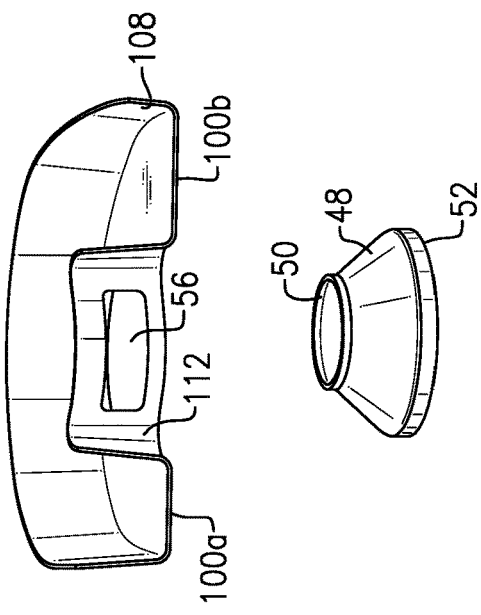
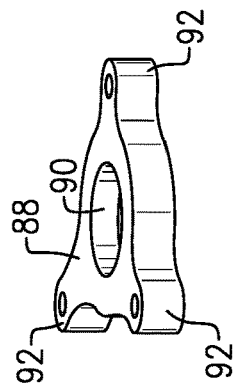
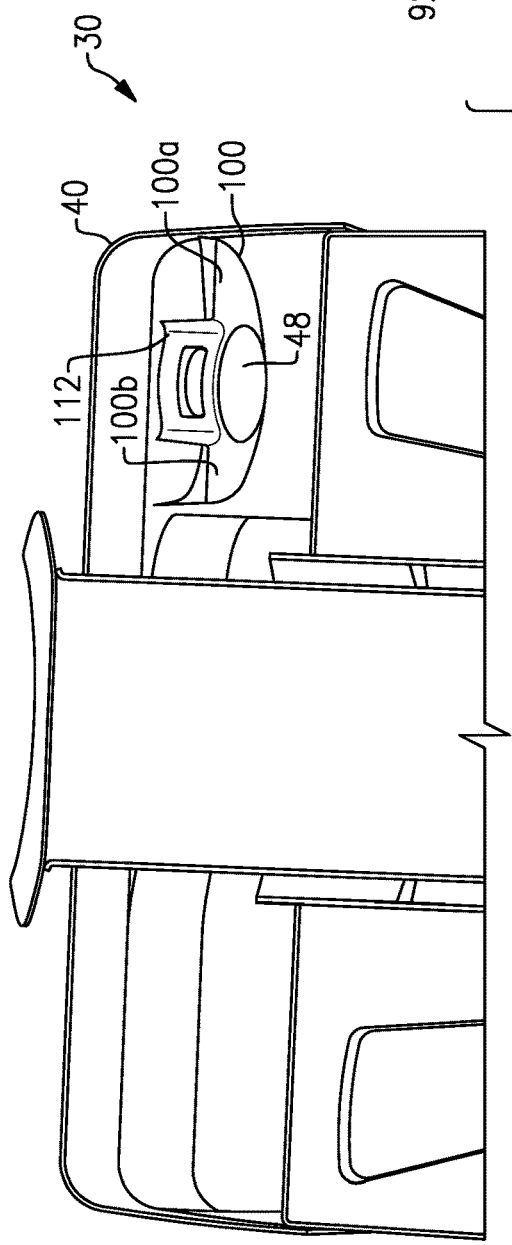
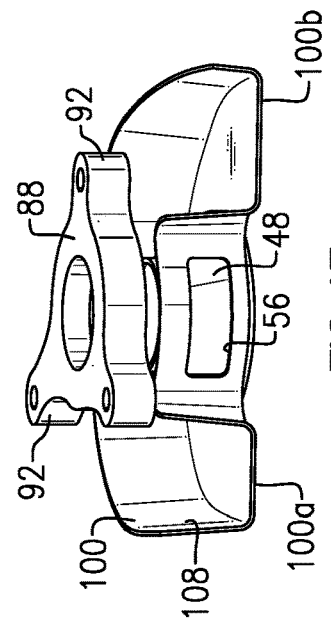
FIG.4D
FIG.4E
FIG.4F

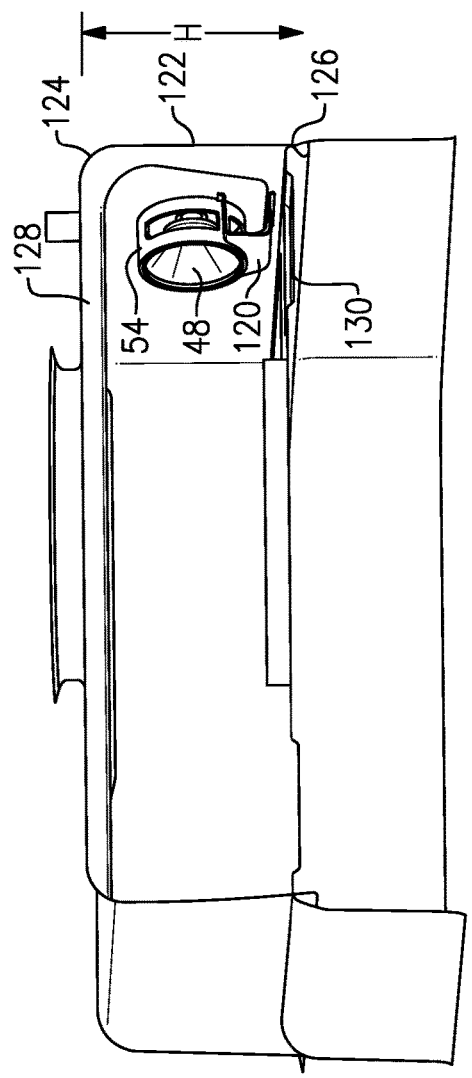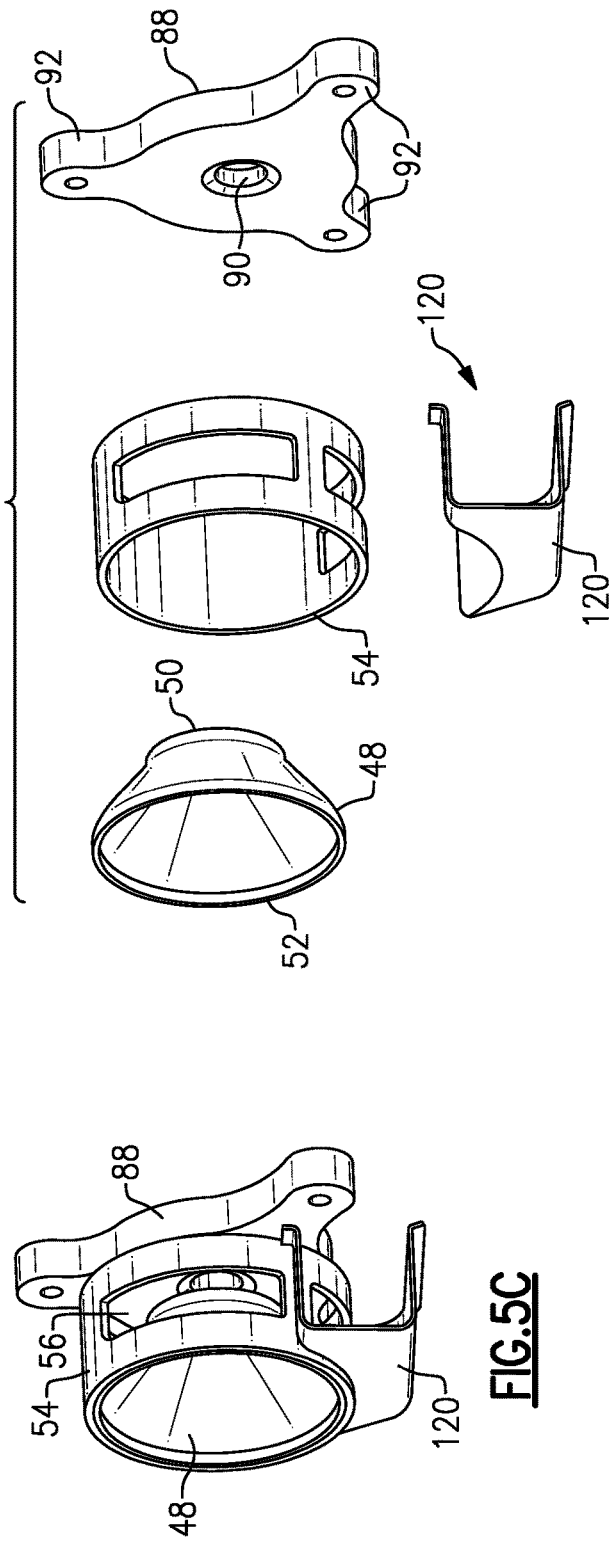
FIG.5A
FIG.5B
FIG.5C

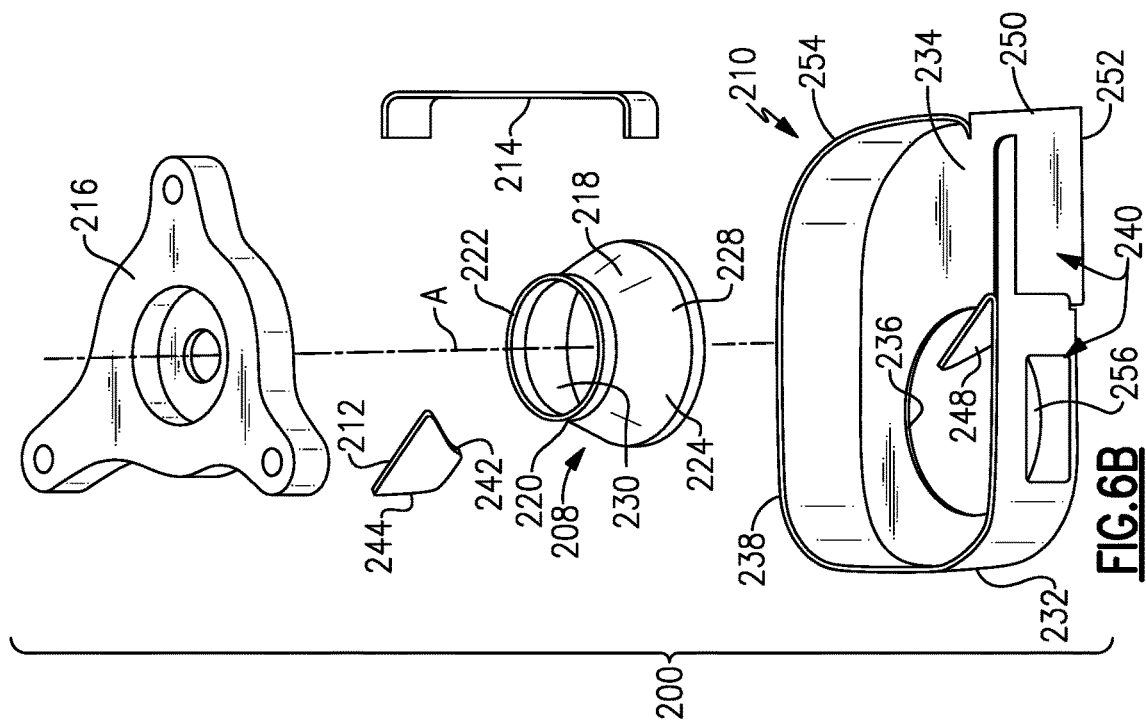
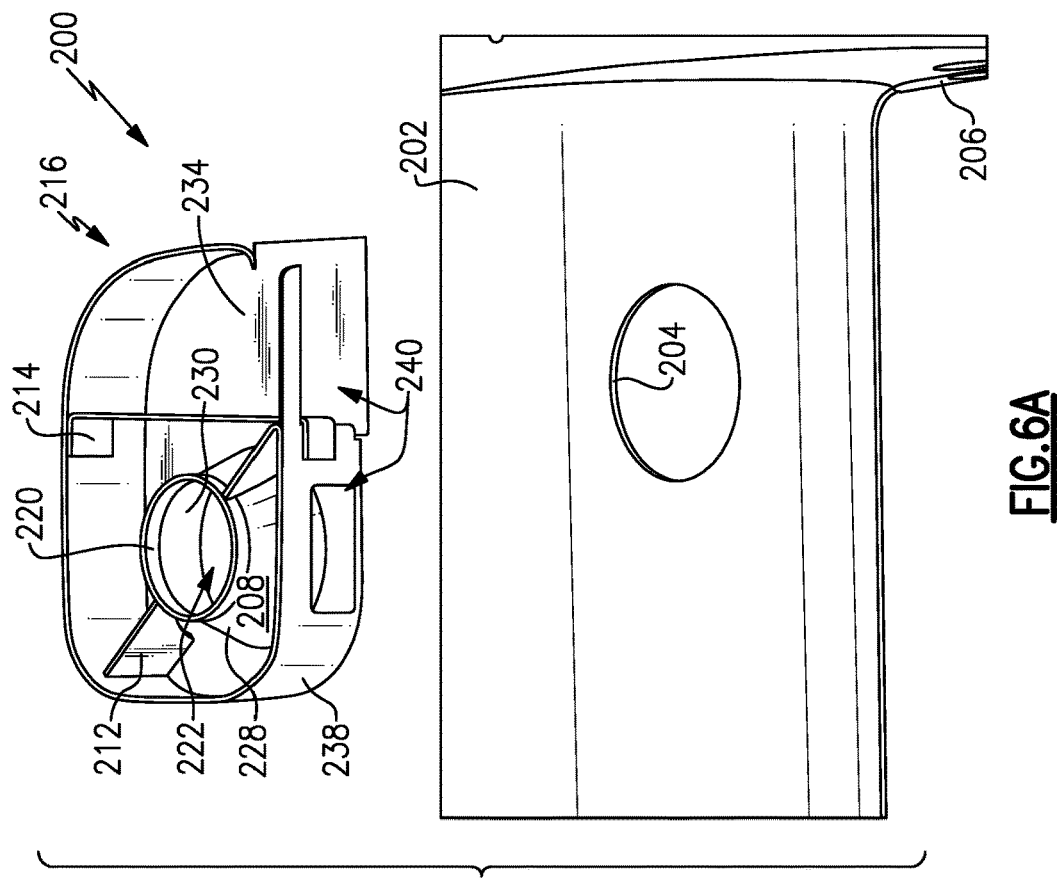

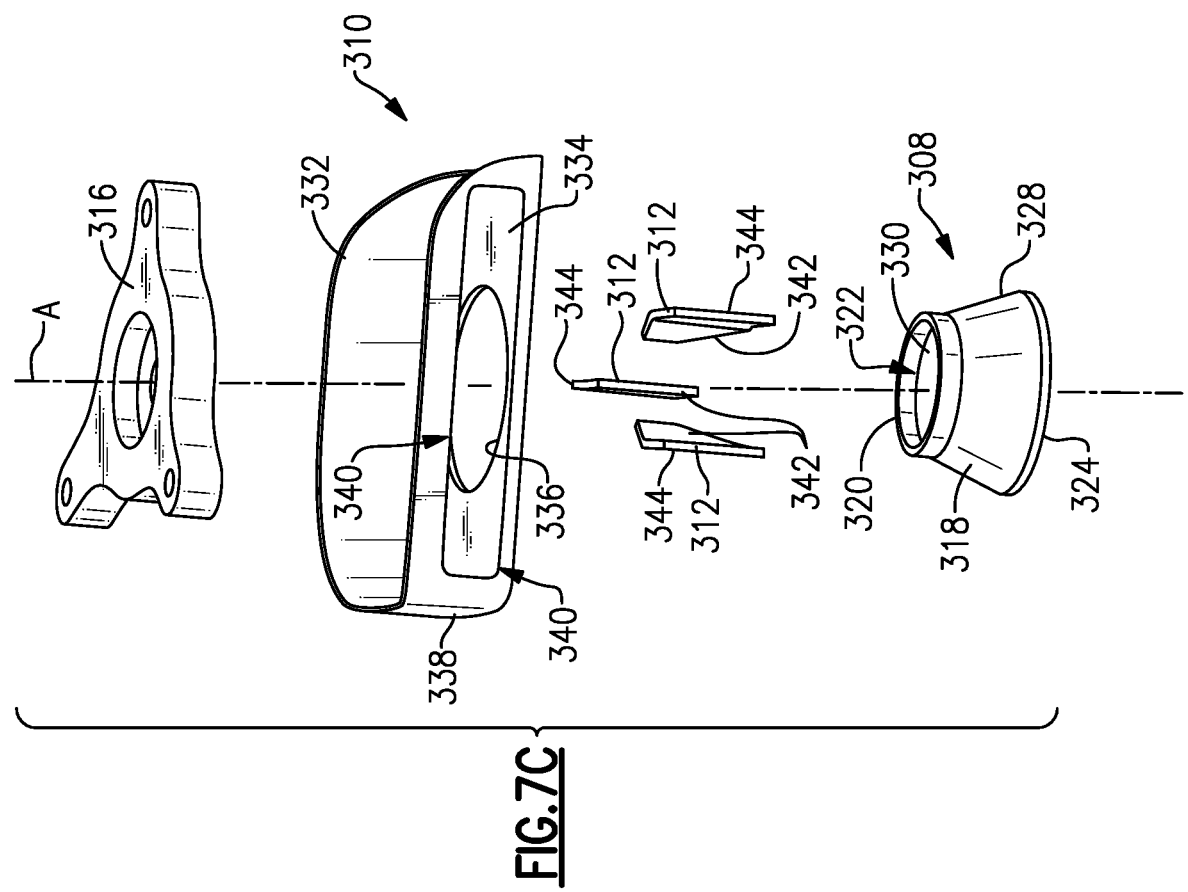
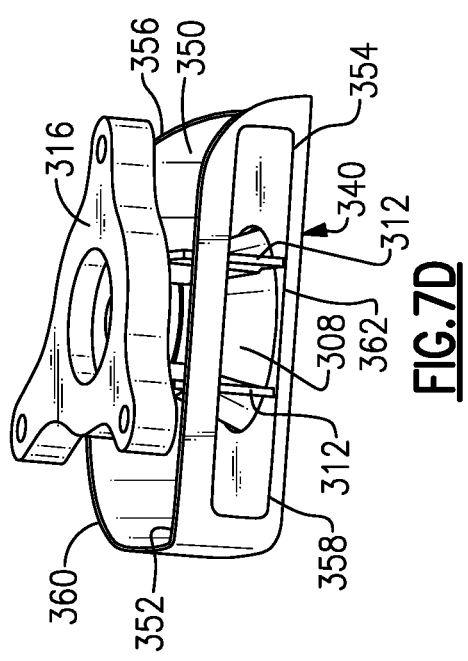
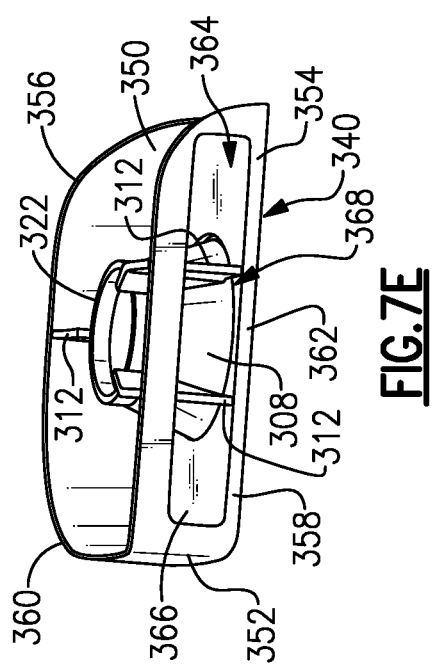

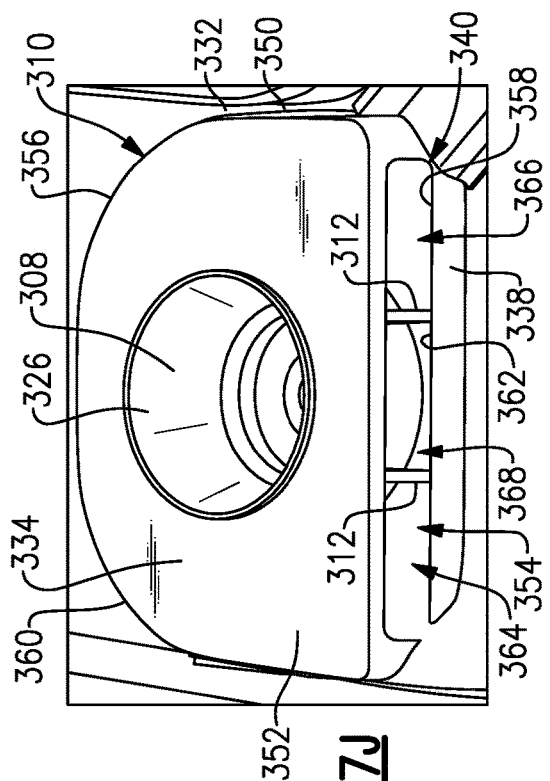

FLOW DIVERTER TO MITIGATE DEPOSITS IN A DOSER CONE

RELATED APPLICATIONS

The subject application is a continuation-in-part application of U.S. application Ser. No. 15/214,509 which was filed on Jul. 20, 2016.

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF) or a reducing agent, such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

In one known configuration, the mixer includes a housing with an opening that receives the doser. A cone is aligned with this opening to provide a widening spray area into the internal cavity of the outer housing. The widening spray area facilitates a more thorough distribution of spray droplets over a larger area as the spray enters the exhaust gas stream.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. In configurations that utilize a cone, deposit initiation sites have been found on the wall of the cone. The deposits in these sites build up over time and can adversely affect system operation.

SUMMARY OF THE INVENTION

In one exemplary embodiment, a mixer for a vehicle exhaust system includes a mixer housing that defines an interior cavity for engine exhaust gases, and which includes a doser opening formed within a wall of the mixer housing. A cone has a cone inlet opening aligned with the doser opening and a cone outlet into the interior cavity. A diverter has at least one first opening that is open to the interior cavity and a second opening that surrounds the cone outlet. Exhaust flow is directed by the diverter to the cone inlet opening to be mixed with a fluid injected through the doser opening.

In a further embodiment of the above, the diverter includes at least one scoop portion having a scoop inlet at the first opening and a contoured wall portion that directs exhaust gas from the scoop inlet to the cone inlet opening.

In a further embodiment of any of the above, the at least one first opening comprises at least a scoop inlet opening at the scoop inlet and a window inlet opening that is separated from the scoop inlet opening such that the scoop inlet opening directs exhaust gas to one side of the cone inlet opening and the window inlet opening directs exhaust gas to an opposite side of the cone inlet opening.

In a further embodiment of any of the above, the at least one scoop portion comprises at least a first scoop portion and a second scoop portion. The first scoop portion has a first scoop inlet at the first opening and a first contoured wall portion that directs exhaust gas from the first scoop inlet to the cone inlet opening. The second scoop portion has a second scoop inlet at the first opening and a second contoured wall portion that directs exhaust gas from the second scoop inlet to the cone inlet opening.

In a further embodiment of any of the above, the mixer includes a plurality of diverter walls wherein each diverter wall has a first edge directly connected to an inner surface of the diverter or mixer housing and a second edge extending toward an outer surface of the cone to divide the diverter into a plurality of flow passages.

In another exemplary embodiment, a mixer for a vehicle exhaust system includes a cone having a cone inlet opening configured to receive a fluid injected by a doser and a cone outlet. A diverter comprises a duct body having a generally flat base portion that includes a cone opening that surrounds the cone outlet and a wall portion that extends outwardly from the base portion about at least a portion of a periphery of the base portion. The duct body includes an inlet opening that is formed at least partially within the wall portion. At least one diverter wall has a first edge adjacent to an outer surface of the cone and extending away from the first edge to a second edge that cooperates with the diverter to divide the diverter into a plurality of discrete flow passages. Exhaust gas flow enters the inlet opening and flows through the flow passages to the cone inlet opening to be mixed with the fluid injected by the doser.

In a further embodiment of any of the above, the inlet opening cooperates with one or more diverter walls to sub-divide the inlet opening into a discrete inlet opening for each flow passage, and wherein the discrete inlet openings are co-planar.

These and other features of this application will be best understood from the following specification and drawings, the following of which is a brief description.

BRIEF DESCRIPTION OF THE DRAWINGS

FIG. 2A is top view of a portion of a mixer with a cone assembly that includes the subject invention.

FIG. 2B is an exploded view of the cone assembly of FIG. 2A.

FIG. 2C is a perspective view of the cone assembly of FIG. 2B.

FIG. 3A is top view of a portion of a mixer with another example of a cone assembly that includes the subject invention.

FIG. 3B is an exploded view of the cone assembly of FIG. 3A.

FIG. 3C is a perspective view of the cone assembly of FIG. 3B.

FIG. 3G is an enlarged view of a portion of FIG. 3A.

FIG. 4A is top view of a portion of a mixer with another example of a cone assembly that includes the subject invention.

FIG. 4B is an exploded view of the cone assembly of FIG. 4A.

FIG. 4C is a perspective view of the cone assembly of FIG. 4B.

FIG. 4D is a bottom view of the cone assembly of FIG. 4C.

FIG. 4E an exploded view of the cone assembly of FIG. 4B but viewed from an opposite side.

FIG. 4F is a perspective view of the cone assembly of FIG. 4C but viewed from an opposite side.

FIG. 5A is top view of a portion of a mixer with another example of a cone assembly that includes the subject invention.

FIG. 5B is an exploded view of the cone assembly of FIG. 5A.

FIG. 5C is a perspective view of the cone assembly of FIG. 5B.

FIG. 6A is an exploded view of another example of a mixer housing portion and cone and diverter assembly.

FIG. 6B is an exploded view of an injector flange and the cone and diverter assembly of FIG. 6A.

FIG. 7C is an exploded view of an injector flange and the mixer housing portion and cone and diverter assembly FIG. 7A.

FIG. 7D is a perspective view of the injector flange and assembled cone and diverter assembly of FIG. 7C.

FIG. 7E is a view similar to 7D but with the injector flange removed.

FIG. 7H is a side view of FIG. 7A

FIG. 7I is an end view of FIG. 7A.

FIG. 7J is a perspective view of FIG. 7I at a cone outlet.

FIG. 7K is a view similar to FIG. 7J but from a cone inlet.

DETAILED DESCRIPTION

Figure 1:
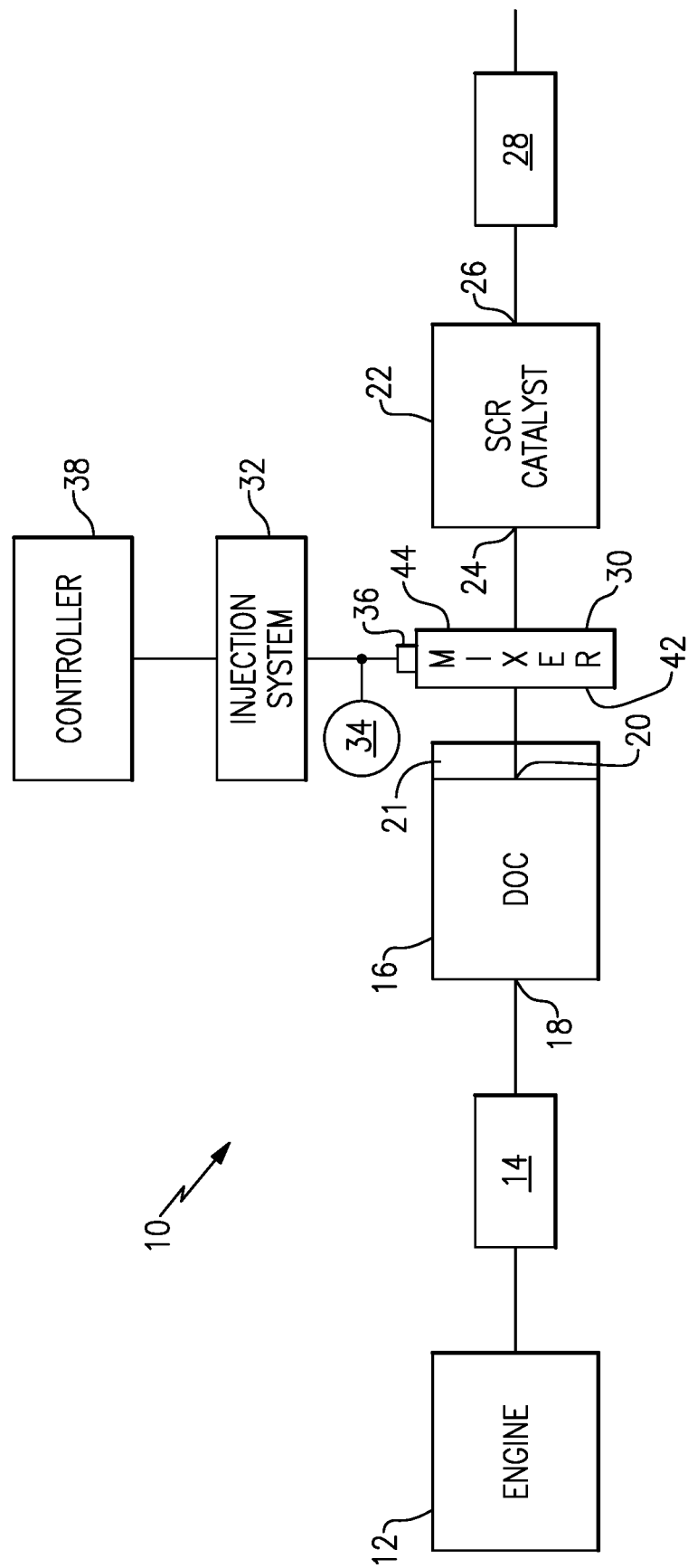
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct exhaust gases into a diesel oxidation catalyst (DOC) 16 having an inlet 18 and an outlet 20. Downstream of the DOC 16 is an optional component 21 that may be a diesel particulate filter (DPF), which is used to remove contaminants from the exhaust gas as known. Downstream of the DOC 16 and optional component 21 is a catalyst component 22, such as a selective catalytic reduction (SCR) for example, having an inlet 24 and an outlet 26. The positions of the inlet 24 and outlet 26 are just examples and the locations may vary.

In this example, an exhaust system pipe will drive the exhaust flow to the catalyst component 22. The outlet 26 communicates exhaust gases to downstream exhaust components 28. Optionally, catalyst component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or component 21 and upstream of the inlet 24 of the SCR catalyst 22. The upstream catalyst and downstream catalyst can be in-line, in parallel or any other configuration. The mixer 30 (as shown in the in-line configuration) is used to generate a swirling or rotary motion of the exhaust gas. An injection system 32 is used to inject a gaseous or liquid reducing agent, such as a solution of urea and water for example, into the exhaust gas stream upstream from the SCR catalyst 22 such that the mixer 30 can mix the injected substance and exhaust gas thoroughly together. In an example, the injection system 32 includes a fluid supply 34, a doser 36, and a controller 38 that controls injection of the reducing agent as known. Optionally, component 36 can be a pipe of introduction of gaseous reducing agent. Operation of the controller 38 to control injection of the reducing agent is known and will not be discussed in further detail.

One example of a mixer 30 that utilizes the subject invention is shown in FIGS. 2A-2E. The mixer 30 includes a mixer housing 40 that defines an interior cavity 42 for receiving the engine exhaust gases. An outer peripheral wall 44 of the housing 40 includes an opening 46 (FIG. 2D) that is configured to receive the doser 36. A cone 48 has a cone inlet opening 50 aligned with the doser opening 46 and a cone outlet opening 52 into the interior cavity 42.

A cylindrical member 54 surrounds at least a portion of the cone 48. In one example, the cylindrical member 54 comprises a pipe. The cylindrical member 54 includes one or more window openings 56. In the example shown, the cylindrical member 54 includes two window openings 56.

The cylindrical member 54 has an overall height defined as the distance between a top edge 58 and a bottom edge 60. The window openings 56 are formed within a wall of the cylindrical member 54 at a location that is between the top edge 58 and bottom edge 60. In one example, the window openings 56 comprise a rectangular shape and extend circumferentially about the cylindrical member 54. The window openings; however, could also have different shapes and/or sizes.

At least one diverter duct 62 is fixed to the mixer housing 40 and has a first duct end 64 open to the interior cavity 42 and a second duct end 66 at least partially overlapping the at least one window opening 56 such that a portion of the engine exhaust gas in the interior cavity 42 is directed to enter the first duct end 64, flow through the at least one window 56 and then flow into the cone inlet opening 50 to be mixed with a fluid injected through the doser opening 46.

The diverter duct 62 includes a scoop portion 68 formed at the first duct end 64 and an attachment portion 70 formed at the second duct end 66. The attachment portion is fixed to an outer surface 72 of the cylindrical member 54. The attachment portion 70 comprises a curved profile that matches a curved surface 72 of the cylindrical member 54.

In the example shown in FIGS. 2A-2E, the at least one diverter duct 62 comprises a single diverter duct 62 that is installed within the mixer 30. Further, in this example, the diverter duct 62 has a curved profile 74 formed opposite the curved profile of the attachment portion 70 wherein the curved profile 74 comprises the scoop portion 68.

Figure 2D:
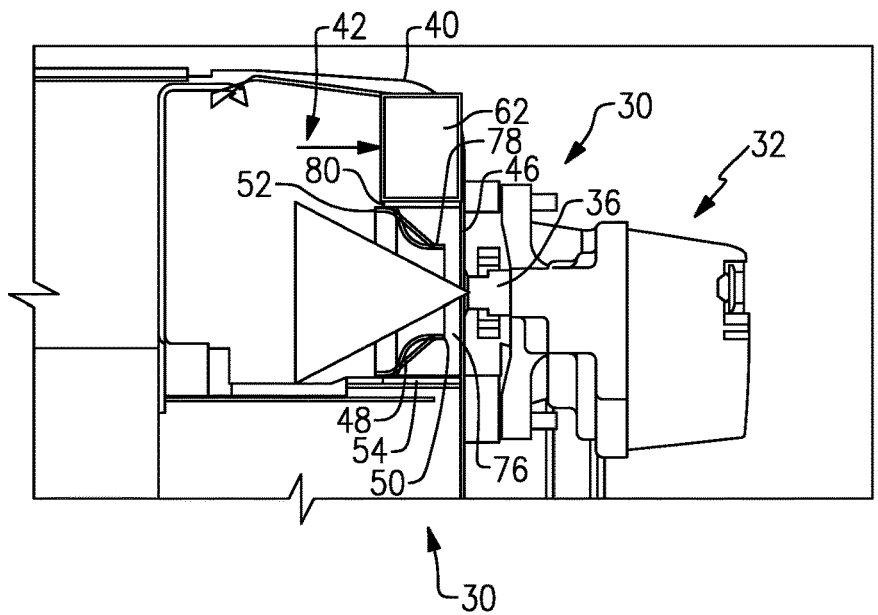
FIG. 2D is a schematic side view of an injector as used with the cone assembly of FIG. 2C.
Figure 2E:
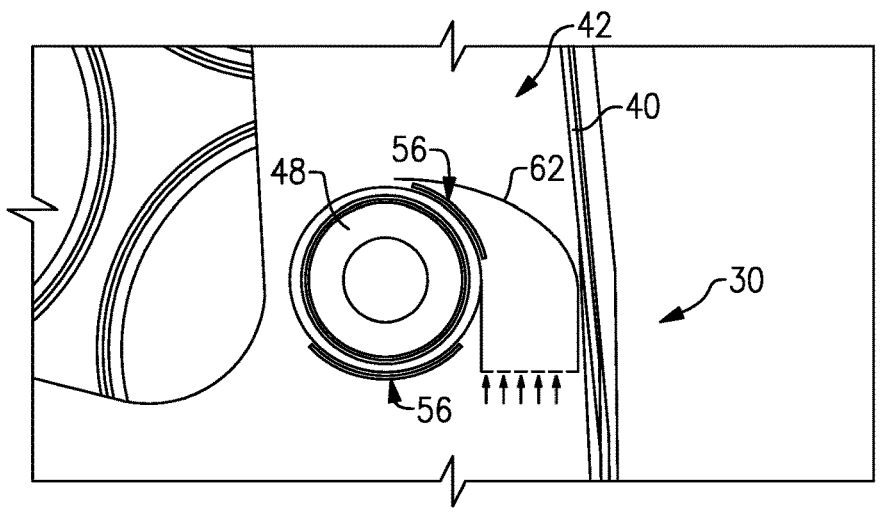
FIG. 2E is a schematic top view of the cone assembly of FIG. 2D showing a diverter duct flow path.

The cone 48 comprises a body having a base end 78 defining the cone inlet opening 50 and an outlet end 80 defining the cone outlet opening 52. At least a portion of the body increases in diameter in a direction extending from the base end 78 toward the outlet end 80. The base end 78 is spaced apart from an inner surface of the mixer housing 40 that surrounds the doser opening 46 to create the gap 76 between the base end 78 of the cone 48 and the mixer housing 40 to allow exhaust gases exiting the at least one window opening 56 to flow into the gap 76 and enter the cone inlet opening 50 (FIG. 2D). The body of the cone 48 includes a first portion at the base end 78 and a second portion that extends from the base end 78 to the outlet end 80. The first portion at the base end 78 comprises a cylindrical portion defined by first outer diameter and the second portion comprises a tapering portion having an increasing diameter from the first portion toward the outlet end 80.

In this type of mixer configuration, the exhaust gas flows past the doser 36 in primarily one direction. To ensure that exhaust gas is flowing into the cone 46 in a desired manner, the diverter duct 62 scoops and directs the exhaust gas to bring the exhaust gas to the inlet opening 50 of the cone 48. This prevents a buildup of urea deposits on the cone 48, which can adversely affect the operating efficiency of the mixer 30. The scoop portion 68 captures sufficient exhaust flow and delivers this flow into a gap 76 between the cone 48 and an inner surface of the wall 44 of the mixer 30. The use of the diverter duct 62 results in a net positive flow of approximately 3%-5% of the total exhaust through the cone 48. Further, there is no leakage of exhaust out of the gap 76 in an opposite direction.

Figure 3D:
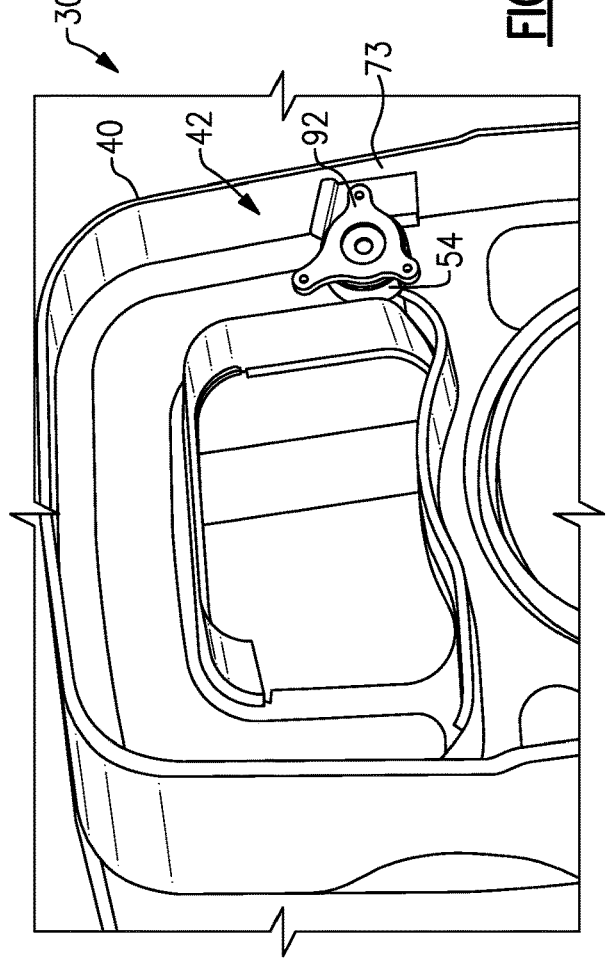
FIG. 3D is a bottom view of the cone assembly of FIG. 3C.
Figure 3E:
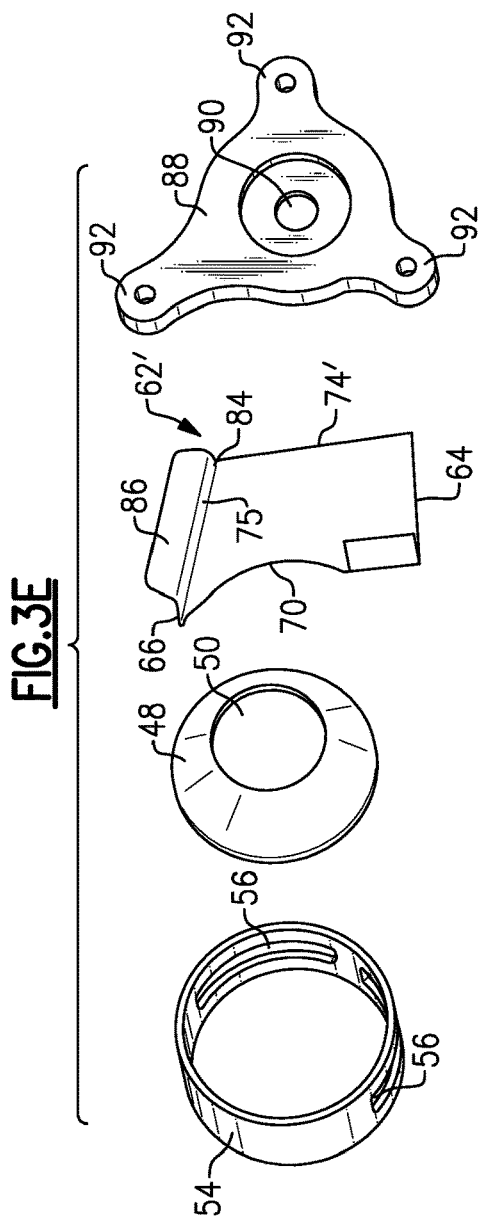
FIG. 3E an exploded view of the cone assembly of FIG. 3B but viewed from an opposite side.
Figure 3F:
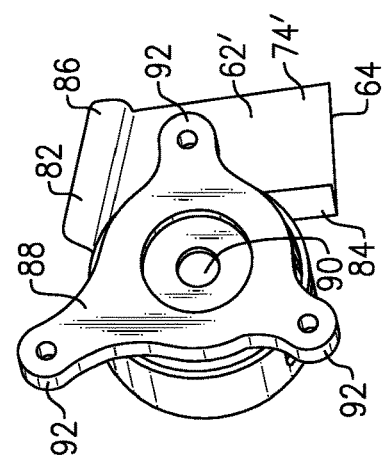
FIG. 3F is a perspective view of the cone assembly of FIG. 3C but viewed from an opposite side.
Figure 5D:
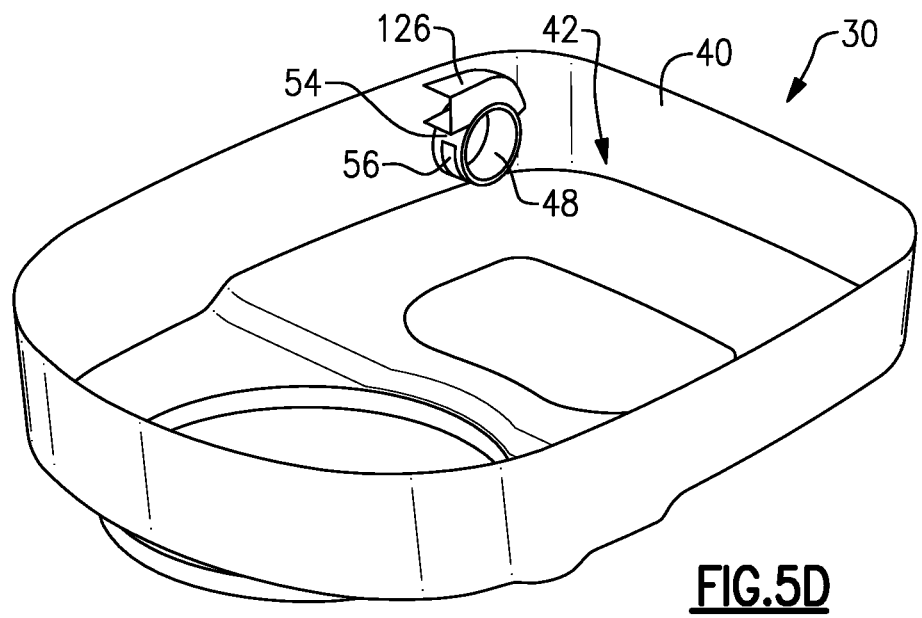
FIG. 5D shows an internal view of an alternate location for the cone assembly of FIG. 5C
Figure 5E:
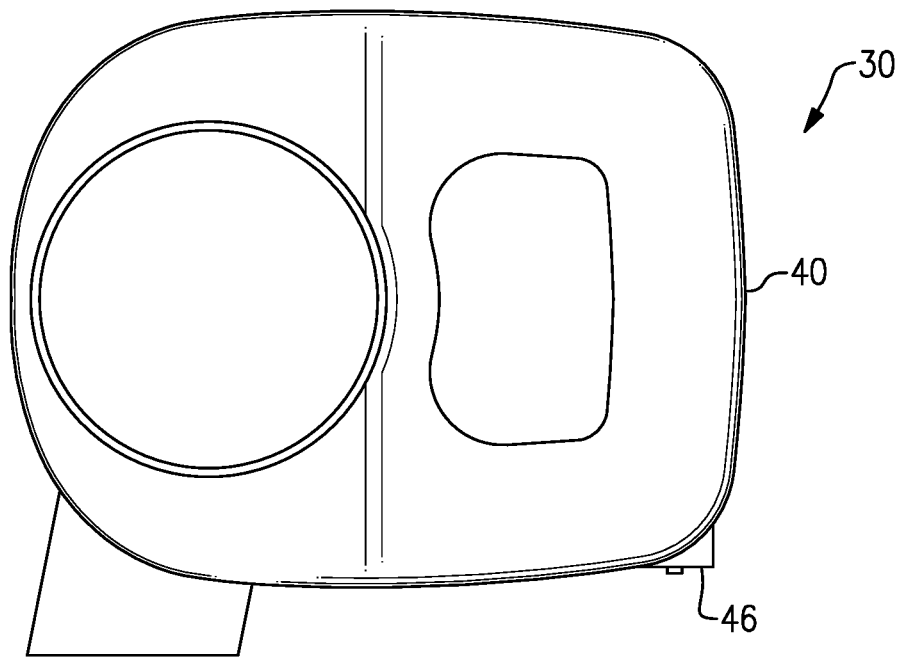
FIG. 5E shows an external view of the alternate location of FIG. 5D.

In the example shown in FIGS. 3A-3F, the at least one diverter duct 62 also comprises a single diverter duct 62' that is installed within the mixer 30; however, in this configuration the diverter duct 62' includes a straight profile 74' formed opposite the curved profile of the attachment portion 70. The straight profile 74' comprises the scoop portion 68 of the duct 62'. The housing 40 forms an outer wall of the scoop as shown at 73 in FIGS. 3D and 3G. The cone 48 and the cylindrical member 54 are the same as that which was discussed above with regard to FIGS. 2A-2E. FIGS. 3A-3C show a top view of the diverter duct 62', while FIGS. 3D-3F show a bottom view of the duct 62'.

The straight profile 74' section of the duct 62' includes a flange 82 that is attached to the housing 40. The duct 62' also includes a straight back wall 75 as shown in FIGS. 3B and 3E. The attachment portion 70 includes the curved profile to be attached to the cylindrical member 54 and includes a downwardly extending leg 84 that forms part of the scoop portion 68. The leg 84 also includes a transversely extending flange 86 that is fixedly attached to the housing 40. Optionally, the transversely extending flange 86 can be removed and the legs 84 can be directly attached to the housing 40.

An injector flange 88 is also included as part of an assembled unit comprising the cone 48, cylindrical member 54, and duct 62'. The injector flange 88 includes a center opening 90 that is aligned within the doser opening 46 and a plurality of mounting legs 92 that are used to attach the doser 36 to the housing 40. The injector flange 88 can also be used in the configuration shown in FIGS. 2A-2E.

FIGS. 4A-4G show a configuration where the at least one diverter duct comprises a double diverter duct 100. In one example, the double diverter duct comprises a first diverter duct 100a being positioned on one side of the cone 48 and a second diverter duct 100b being positioned on an opposite side of the cone 48. The cone 48 and injector flange 88 are the same as described above. However, in this example, the cylindrical member 54 and the first 100a and second 100b diverter ducts are formed as a single-piece component 102. Optionally, the ducts could be separately attached in manner similar to that described above. Further, while two ducts are shown on opposite sides of the cone 48, it should be understood that the two ducts could also be on the same side of the cone 48.

The component 102 includes a base plate 104 that includes a center opening 106 that is aligned with the outlet opening 52 of the cone 48. A flange 108 extends downwardly from an outer peripheral edge 110 of the base plate 104 to form the walls for the scoop portion 68 of the ducts 100a, 100b. The center opening 106 comprises an attachment interface 70' for attachment to the cone 48.

The first 100a and second 100b ducts include a curved profile 74' formed opposite the center opening 106 of the attachment interface 70'. The curved profile 74' comprises the scoop portion 68 of the duct 62'. FIGS. 4A-4C show a top view of the diverter duct 62', while FIGS. 4D-4F show a bottom view of the duct 62'. As shown in FIG. 4E, the component 102 includes at least one window opening 56 and an inner flange portion 112 that extends downwardly for attachment to the housing 40. The window opening 56 is formed in the flange portion 112.

Figure 4G:
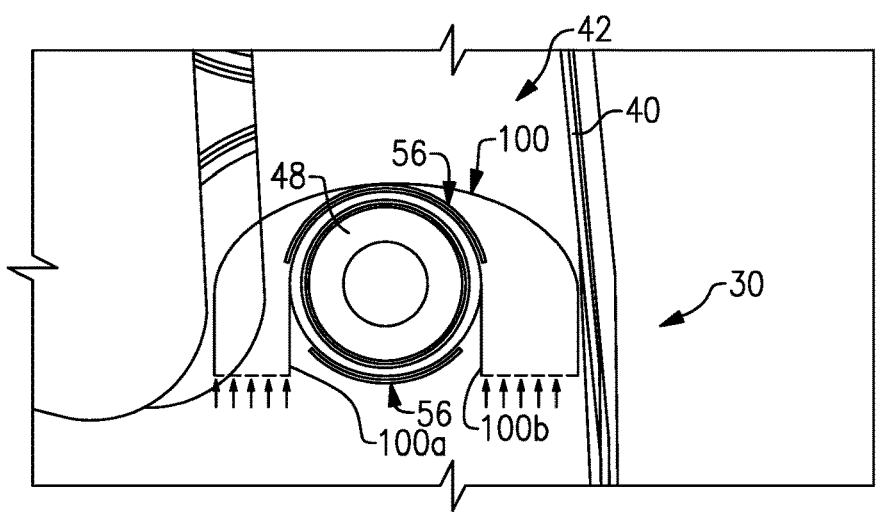
FIG. 4G is a schematic top view of the cone assembly of FIG. 4C showing a diverter duct flow path.

FIG. 4G shows the flow pattern of the exhaust gas into the ducts 100a, 100b when they are separately attached to a cylindrical member 54 with a plurality of window openings 56. The ducts 100a, 100b scoop the exhaust gas around to the sides and back of the cone 48 to prevent leakage and reduce urea deposits.

FIGS. 5A-5E show an example of smaller mini-scoop or duct 120 that allows the doser to be positioned symmetrically within the mixer 30. The mini-duct 120 is similar to that which is shown in FIGS. 3A-3F but is smaller in size. The cone 48, cylindrical member 54, and injector flange 88 are the same as that shown in FIGS. 3A-3F.

As shown in FIG. 5A, the mixer housing 40 includes an outer wall portion 122 that includes the doser opening 46.

The outer wall portion 120 is defined by a first edge 124 spaced apart from a second edge 126 by a wall height H. The first edge 124 starts at an outer top wall 128 and the second end is located at an inner baffle wall 130 located within the interior cavity 42. The doser opening 46 is formed within the outer wall 122 at a location that is generally an equal distance from the first edge 124 and the second edge 126. The mini-duct 120 is positioned on an inner surface of the outer wall 122 on one side of the cone 48. Optionally, two min-ducts 120 could be used, one on each side of the cone 48.

Figure 6C:
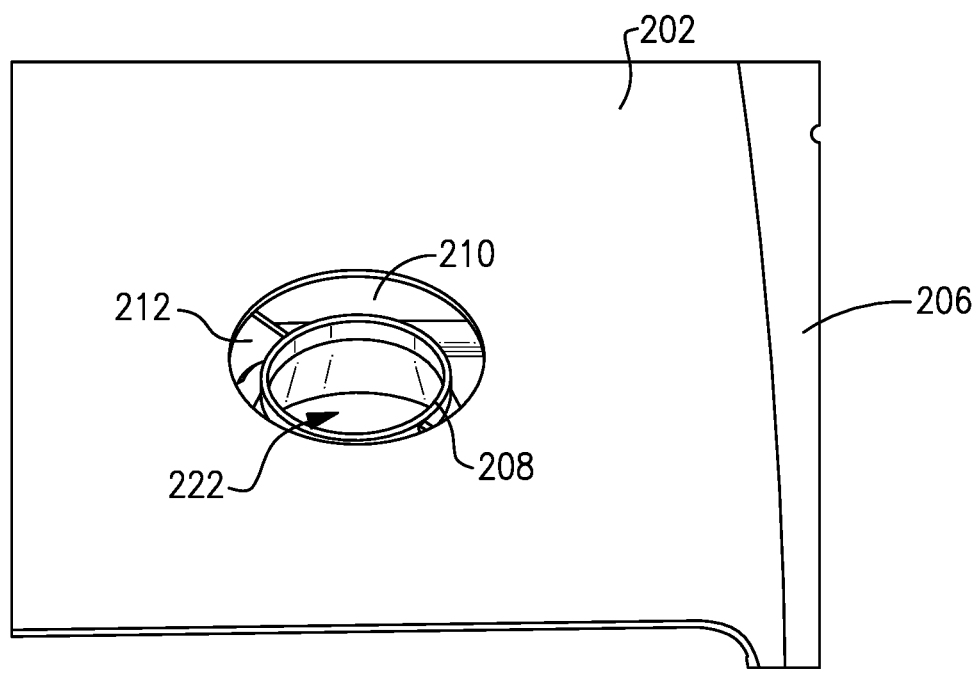
FIG. 6C is an assembled view of the mixer housing portion and cone and diverter assembly FIG. 6A.
Figure 6G:
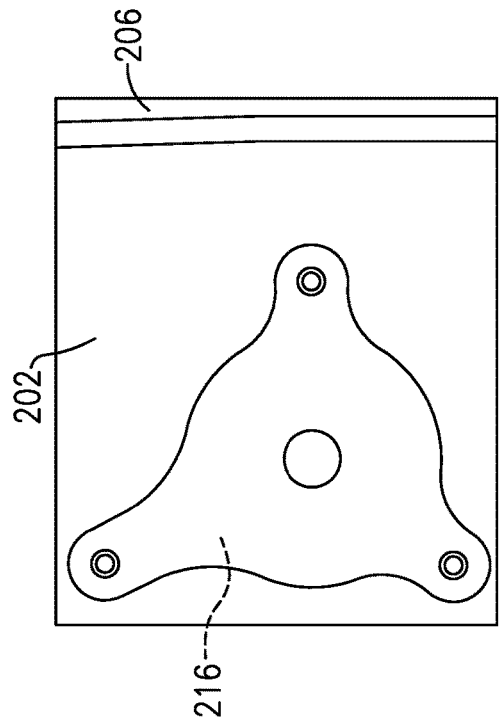
FIG. 6G is an end view of the housing portion in relation to the injector flange mount configuration.

FIGS. 6A-6H show another example of a cone and diverter assembly 200 for a mixer 30 (FIG. 1). As shown in FIG. 6A, the mixer 30 includes a mixer housing portion 202 that includes a doser opening 204 for a doser 36 and a housing wall 206 configured to attach to another mixer housing portion (not shown) to enclose the cone and diverter assembly 200 within an interior cavity of the mixer 30. As shown in FIG. 6B, the cone and diverter assembly 200 includes a cone 208, a diverter 210, at least one diverter wall 212, and a bracket 214 that is used to divert exhaust flow from flowing directly toward the cone inlet opening 222. An injector flange 216 is used to mount the doser 36 to the mixer housing portion 202 as described above.

Figure 6H:
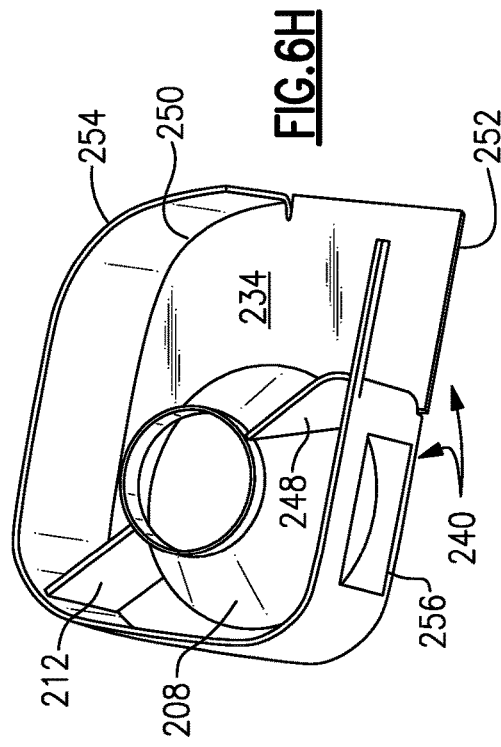
FIG. 6H is a perspective view of FIG. 6F but without the mounting bracket.
Figure 6D:
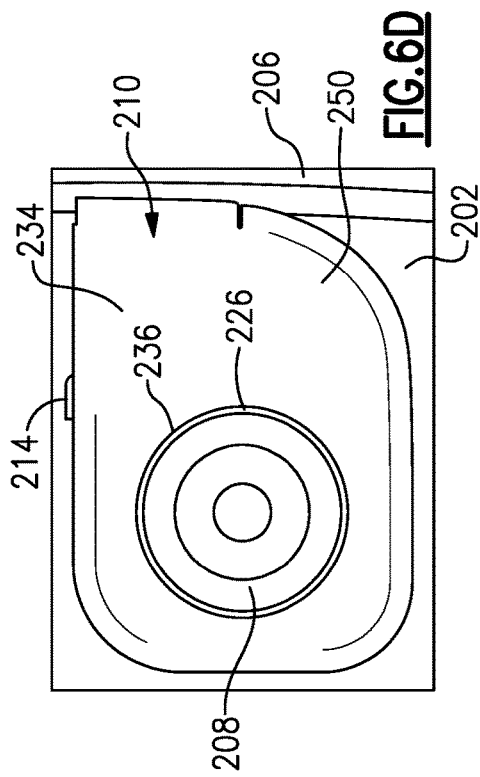
FIG. 6D is an end view of the assembly of FIG. 6C showing an outlet opening of the cone.

The cone 208 comprises a body 218 having a base end 220 defining a cone inlet opening 222 and an outlet end 224 defining a cone outlet opening 226 (FIG. 6D). As described above, at least a portion of the body 218 increases in diameter in a direction extending from the base end 220 toward the outlet end 224. The cone inlet opening 222 thus has a smaller diameter than the cone outlet opening 226. The cone 208 has an outer surface 228 and an inner surface 230 that surround a cone center axis A.

The diverter 210 comprises a duct body 232 having a generally flat base portion 234 that includes a cone opening 236 that surrounds the cone outlet opening 226 and a wall portion 238 that extends outwardly from the base portion 234 about at least a portion of a periphery of the base portion 234. The duct body 232 includes an inlet opening 240 that is formed at least partially within the wall portion 238. The least one diverter wall 212 has a first edge 242 positioned immediately adjacent to the outer surface 228 of the cone 208. In one example, the first edge 242 is in direct abutting engagement with, or directly connected to, the outer surface 228 of the cone 208. The wall 212 extends outwardly from the cone 208 to a second edge 244 that cooperates with the diverter 210 to divide the diverter 210 into a plurality of discrete flow passages where exhaust gas flow enters the inlet opening 240 and flows through the flow passages to the cone inlet opening 222 to be mixed with the fluid injected by the doser 36.

The diverter 210 is held fixed to the mixer housing portion 202 by an attachment interface 246 between the mixer housing portion 202 and at least one of the wall portion 238 and base portion 234. Any type of attachment method can be used to provide the attachment interface such as welding, brazing, fastening, gluing, etc. for example. Further, various portions of the diverter 210 could be attached to the mixer housing portion 202 at multiple locations if needed.

In the example shown in FIGS. 6A-6H, the assembly 200 includes at least one discrete diverter wall 212 that extends from a corner of the duct body 232 toward the cone 208. The first edge 242 of the diverter wall 212 is adjacent to the outer surface 228 of the cone 208 and the second edge 244 is directly connected to the wall portion 238 of the diverter 210. Optionally, if the mixer housing forms an enclosing wall at this location, the second edge 244 could be directly connected to the mixer housing. Another diverter wall 248 is formed as part of the duct body 232 and extends from the wall portion 238 toward the outer surface 228 of the cone 208.

In one example, the diverter walls 212, 248 extend in a generally radial direction relative to the center axis A of the cone 208. The diverter walls 212, 248 are circumferentially spaced apart from each other about the center axis A.

Figure 6E:
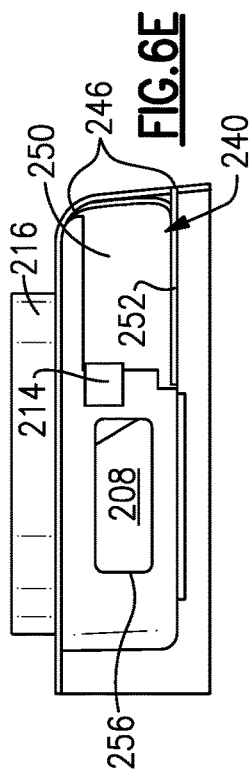
FIG. 6E is a side view of the assembly of FIG. 6D.
Figure 6F:
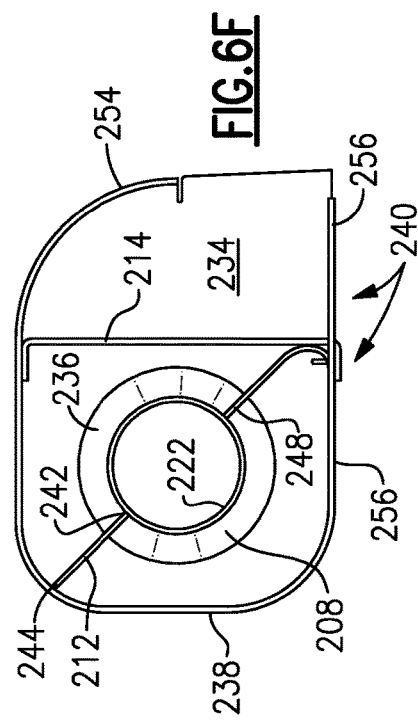
FIG. 6F is an end view of the assembly of FIG. 6C with the housing portion removed and showing an inlet opening of the cone.

As best shown in FIGS. 6C, 6E, and 6H, the diverter 210 includes at least one scoop portion 250 having a scoop inlet 252 at the first opening 240 and a contoured wall portion 254 that directs exhaust gas from the scoop inlet 252 to the cone inlet opening 222. In one example, the contoured wall portion 254 has a curved profile. In this example, the first opening 240 comprises at least a scoop inlet opening at the scoop inlet 252 and a window inlet opening 256 that is separated from the scoop inlet opening such that the scoop inlet opening at the scoop inlet 252 directs exhaust gas to one side of the cone inlet opening 222 and the window inlet opening 256 directs exhaust gas to an opposite side of the cone inlet opening 222.

In one example, the scoop inlet opening at the scoop inlet 252 and the window inlet opening 256 are co-planar. This arrangement simplifies the construction of the diverter.

Figure 7B:
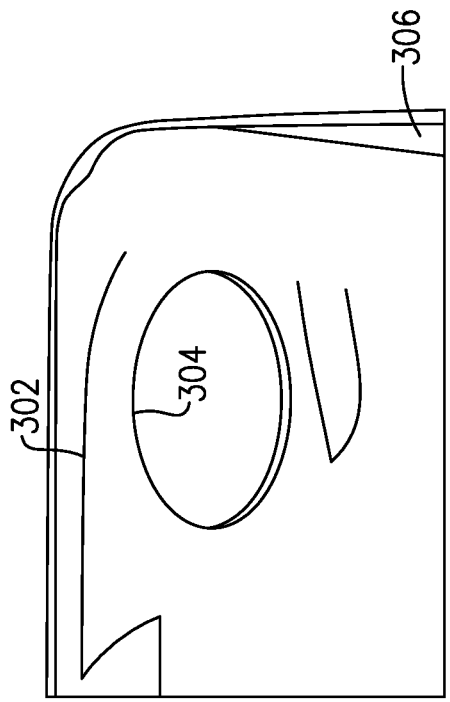
FIG. 7B is a perspective view of the mixer housing portion of FIG. 7A.
Figure 7A:
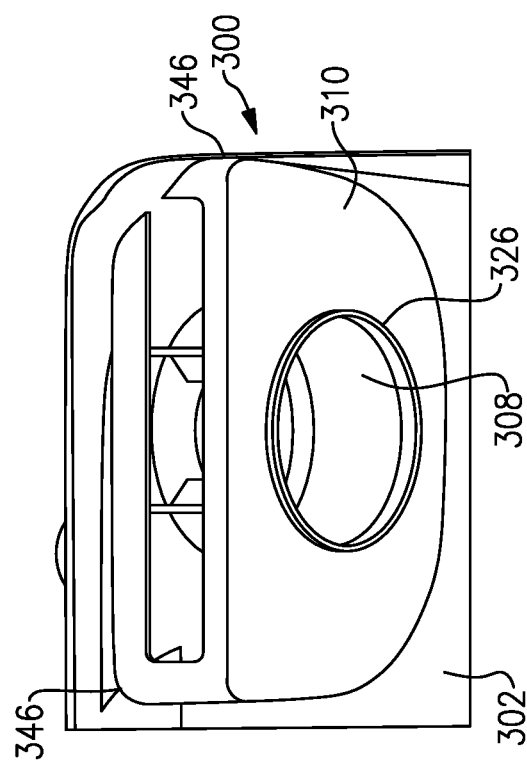
FIG. 7A is a perspective view of another example of a mixer housing portion and cone and diverter assembly.
Figure 7F:
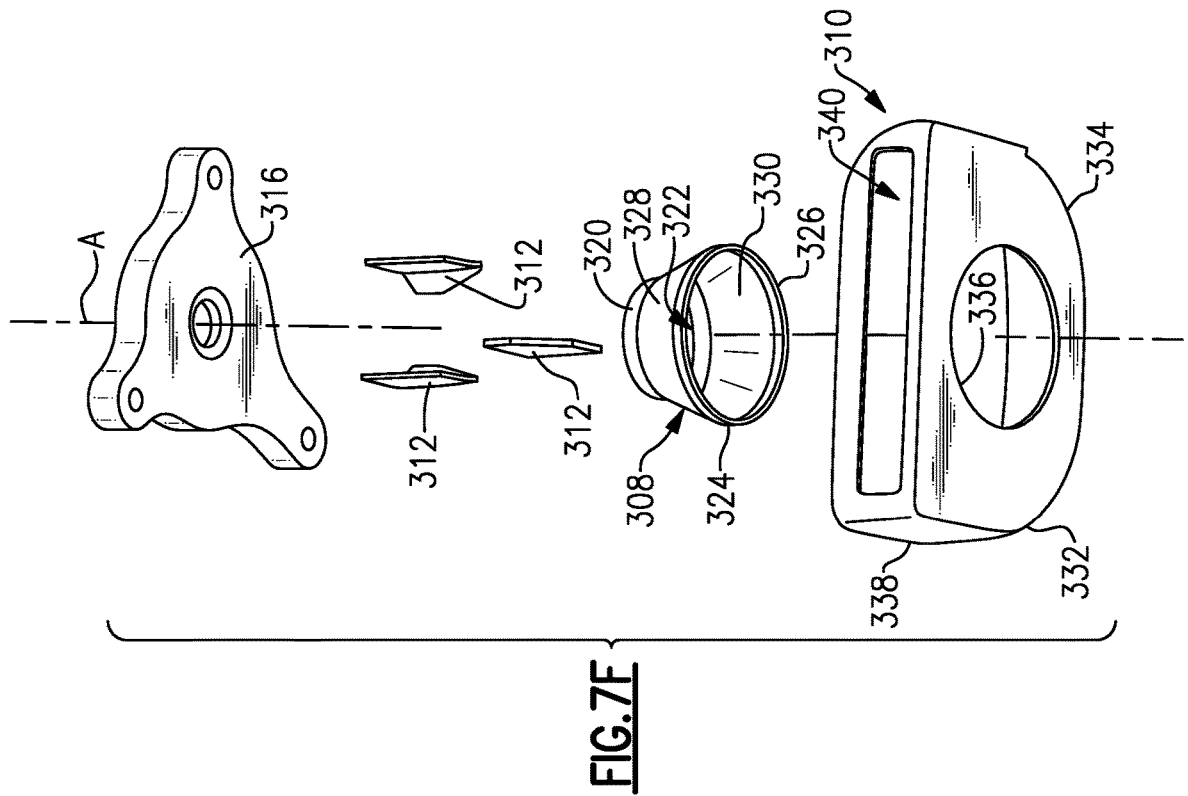
FIG. 7F is a view similar to FIG. 7C but from an opposite end.
Figure 7G:
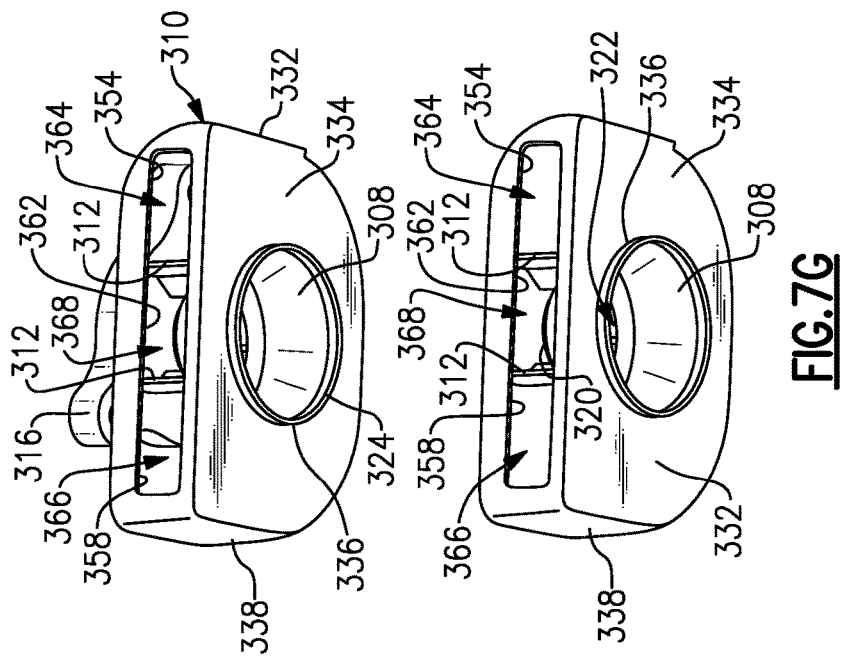
FIG. 7G is an assembled view from the perspective of FIG. 7F but with the injector flange removed.

FIGS. 7A-7K show another example of a cone and diverter assembly 300 for a mixer 30 (FIG. 1). As shown in FIGS. 7A-B, the mixer 30 includes a mixer housing portion 302 that includes a doser opening 304 for a doser 36 and a housing wall 306 configured to attach to another mixer housing portion (not shown) to enclose the cone and diverter assembly 300 within an interior cavity of the mixer 30. As shown in FIG. 7C, the cone and diverter assembly 300 includes a cone 308, a diverter 310, and a plurality of diverter walls 312. An injector flange 316 is used to mount the doser 36 to the mixer housing portion 302 as described above.

The cone 308 comprises a body 318 having a base end 320 defining a cone inlet opening 322 and an outlet end 324 defining a cone outlet opening 326 (FIG. 7A). As described above, at least a portion of the body 318 increases in diameter in a direction extending from the base end 320 toward the outlet end 324. The cone inlet opening 322 thus has a smaller diameter than the cone outlet opening 326. The cone 308 has an outer surface 328 and an inner surface 330 that surround a cone center axis A.

The diverter 310 comprises a duct body 332 having a generally flat base portion 334 that includes a cone opening 336 that surrounds the cone outlet opening 326 and a wall portion 338 that extends outwardly from the base portion 334 about at least a portion of a periphery of the base portion 334. The duct body 332 includes an inlet opening 340 that is formed at least partially within the wall portion 338. The diverter walls 312 each have a first edge 342 immediately adjacent to the outer surface 328 of the cone 208. In one example, the first edge 342 is in direct abutting engagement with, or directly connected to, the outer surface 328 of the cone 308. The walls 312 extend outwardly from the cone 308 to a second edge 344 that cooperates with the diverter 310 or mixer housing to divide the diverter 310 into a plurality of discrete flow passages where exhaust gas flow enters the inlet opening 340 and flows through the flow passages to the cone inlet opening 322 to be mixed with the fluid injected by the doser 36.

The diverter 310 is held fixed to the mixer housing portion 302 by an attachment interface 346 between the mixer housing portion 302 and at least one of the wall portion 338 and base portion 334. Any type of attachment method can be used to provide the attachment interface such as welding, brazing, fastening, gluing, etc. for example. Further, various portions of the diverter 310 could be attached to the mixer housing portion 302 at multiple locations if needed.

In the example shown in FIGS. 7A-7K, the assembly 300 includes three discrete diverter walls 312 that extend from an inner surface of the duct body 232 toward the cone 308. The first edge 342 of each diverter wall 312 is adjacent to the outer surface 328 of the cone 308 and the second edge 344 is directly connected to the wall portion 338 of the diverter 310. Optionally, if the mixer housing forms an enclosing wall at any of the diverter wall locations, the second edge 344 could be directly connected to the mixer housing.

In one example, the diverter walls 312 extend in a generally radial direction relative to the center axis A of the cone 308. The diverter walls 312 are circumferentially spaced apart from each other about the center axis A.

In this example, the diverter 310 includes at least a first scoop portion 350 and a second scoop portion 352 that are positioned on opposing sides of the cone 308. In one example configuration, the scoop portions 350, 352 are positioned symmetrically about the cone 308, which allows the doser 36 to be centered within the duct body 332. The first scoop portion 350 has a first scoop inlet 354 at the first opening 340 and a first contoured wall portion 356 that directs exhaust gas from the first scoop inlet 354 to the cone inlet opening 322. The second scoop portion 352 has a second scoop inlet 358 at the first opening 340 and a second contoured wall portion 360 that directs exhaust gas from the second scoop inlet 358 to the cone inlet opening 322. In one example, the contoured wall portions 356, 360 have a curved profile.

In this example configuration, the first opening 340 comprises at least a first scoop inlet opening at the first scoop inlet 354 and a second scoop inlet opening at the second scoop inlet 358 such that the first scoop portion 350 directs exhaust gas to one side of the cone 308 and the second scoop portion 352 directs exhaust gas to an opposite side of the cone 308. The contoured wall portions 356, 360 facilitate a more even distribution of the exhaust gases about the cone inlet opening 322.

In one example, the first opening 340 further includes a window inlet opening 362 that is positioned between the first and second scoop inlet openings at the first 354 and second 358 scoop inlets such that the window inlet opening 362 directs exhaust gas to portion of the cone inlet opening 322 that is between the first 350 and second 352 scoop portions. In this example configuration, the diverter walls 312 divide the diverter 310 into at least three discrete flow passages that include at least a first flow passage 364 for the first scoop portion 350, a second flow passage 366 for the second scoop portion 352, and third flow passage 368 for the window inlet opening 362. The third diverter wall 312 is positioned opposite from the two diverter walls 312 to separate the first 364 and second 366 flow passages from each other.

As best shown in FIGS. 7C-E and FIG. 7I, in this example configuration the first opening 340 comprises a single opening formed within the wall portion 338 of the diverter 310. Two diverter walls 312 extend from the outer surface 328 of the cone 308 to the wall portion 338 at the first opening 340 such that the single opening cooperates with the two diverter walls 312 to define the window inlet opening 362 and the first and second scoop inlet openings at the first 354 and second 358 scoop inlets within a common plane. In one example, the diverter walls 312 are arranged such that approximately one-third of the exhaust gas enters each of the flow passages 364, 366, 368. This arrangement centers the cone 308 and doser 36 within the duct body 332 and facilitates a more even distribution of exhaust gas around the cone 308 and into the cone inlet opening 322.

In each of the example configurations, the diverter walls 212, 312 are adjacent to the cone 208, 308 such that the walls divide the diverter into a plurality of flow passages. As the cone 208, 308 has a tapered body portion the first edge 242, 342 is contoured or shaped to followed the shape of the outer surface of the cone 208, 308. The second edge 244, 344 of the diverter walls 212, 312 can also be shaped to follow the shape of the diverter or mixer housing wall.

Figure 8A:
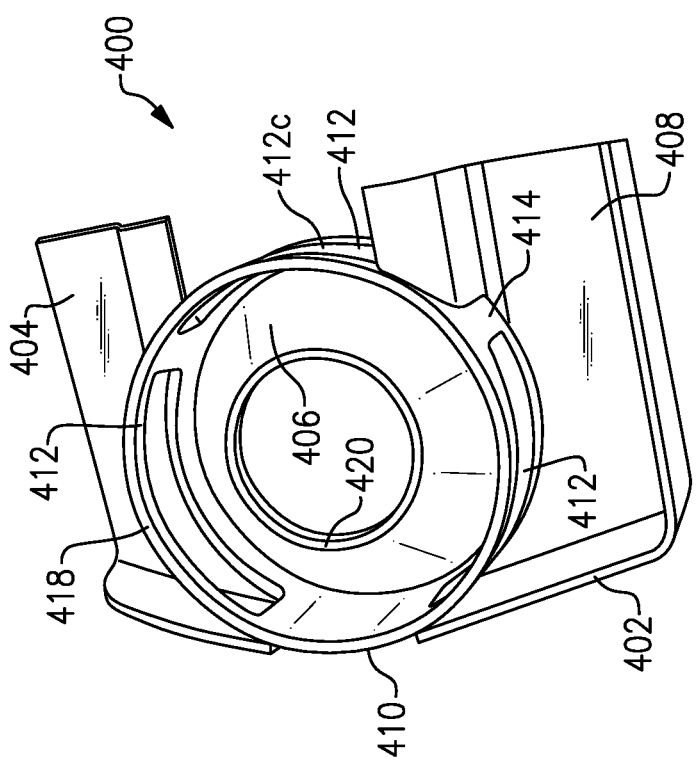
FIG. 8A is a perspective view of another example of a cone, cylindrical member, and diverter assembly.
Figure 8B:
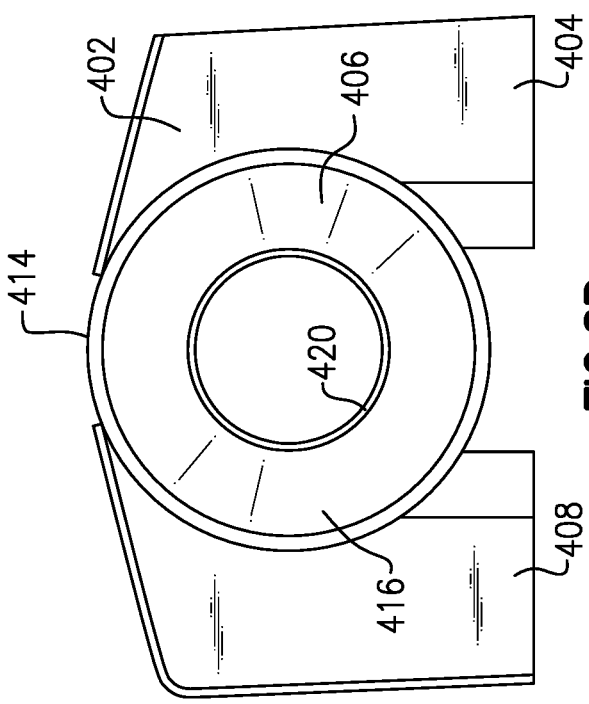
FIG. 8B is an end view of the assembly of FIG. 8A.
Figure 8C:
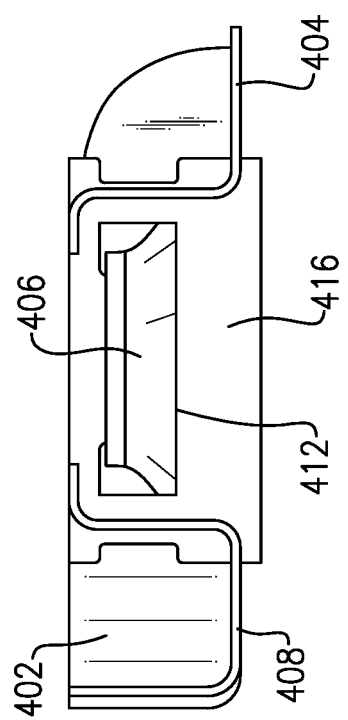
FIG. 8C is a side view of the assembly of FIG. 8A.

FIGS. 8A-8C show another example embodiment of a diverter and cone assembly 400. This example is similar to that of FIGS. 4A-4E but with the flange portion 112 removed. In this example, the assembly includes a diverter 402 having a first scoop portion 404 being positioned on one side of a cone 406 and a second scoop portion 408 being positioned on an opposite side of the cone 406. The cone 408 is the same as described above. The assembly further includes a cylindrical member 410 with a plurality of window openings 412. The cylindrical member 410 has a first end 414 attached to an outlet end 416 of the cone 406 and a second end 418 that surrounds an inlet end 420 of the cone 406.

As shown in FIG. 8A, in this example there are three window openings 412. The first scoop portion 404 directs exhaust gas toward one window opening 412 and the second scoop portion 408 directs exhaust gas toward another window opening 412. The third window opening 412c is positioned between the first 404 and second 408 scoop portions. Flow enters the window openings 412 and is directed to the inlet end 420 of the cone 406 in a manner similar to that shown above with FIGS. 4A-4E.

Each of the disclosed embodiments provides a more compact configuration than traditional mixers and allows the doser and associated cone to be mounted at different locations on the housing. In the example shown in FIGS. 5D and 5E, the cone 48 is mounted in a corner of the housing 40. As discussed above, the mini-duct 120 is configured to provide for a symmetric placement within the housing to allow for more efficient mixing. When the example configuration of FIG. 2A or 3A is used, the doser opening is formed within the outer wall 122 a location that is closer to one of the first 124 and second 126 edges than the other of the first 124 and second 126 edges. The example configuration of FIG. 7A allows the doser to be centered within the duct. Further, the examples of FIGS. 6A and 7A eliminate the need for a cylindrical member which reduces cost and make assembly more efficient.

The subject invention provides a diverting scoop or duct that is used in combination with the doser cone to provide a sufficient quality and quantity of exhaust flow to mitigate urea deposits in the doser cone. The scoop/duct diverts or directs exhaust gas into the gap at the inlet of the cone to prevent leakage. The single, double, or mini-duct designs allow the doser to be placed in many different areas on the mixer housing to provide more design flexibility.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer for a vehicle exhaust system comprising:
   a mixer housing defining an interior cavity to receive engine exhaust gases;

a doser opening formed within a wall of the mixer housing;

a cone having a cone inlet opening aligned with the doser opening and a cone outlet opening into the interior cavity; and a diverter having at least one first opening that is open to the interior cavity and a second opening at the cone outlet that extends at least partially around the cone outlet in a circumferential direction, and wherein exhaust flow is directed by the diverter through the at least one first opening to the cone inlet opening to be mixed with a fluid injected through the doser opening.

2. The mixer according to claim 1 wherein the cone comprises a body having a base end defining the cone inlet opening and an outlet end defining the cone outlet opening, and wherein at least a portion of the body increases in diameter in a direction extending from the base end toward the outlet end.

3. The mixer according to claim 1 wherein the diverter comprises a duct body having a base portion that includes the second opening and a wall portion that extends outwardly from the base portion about at least a portion of a periphery of the base portion, and wherein the at least one first opening is formed at least partially within the wall portion, and wherein at least a portion of the second opening has a curved profile.

4. The mixer according to claim 3 wherein the diverter is held fixed to the mixer housing by an attachment interface between the mixer housing and at least one of the wall portion and the base portion.

5. The mixer according to claim 3 including at least one diverter wall having a first edge directly connected to the wall portion or the mixer housing and a second edge extending toward an outer surface of the cone to divide the diverter into at least two flow passages.

6. The mixer according to claim 5 wherein the at least one diverter wall comprises a plurality of diverter walls, with each diverter wall having the first edge directly connected to the wall portion or the mixer housing and the second edge extending toward the outer surface of the cone to divide the diverter into a plurality of flow passages.

7. The mixer according to claim 6 wherein the plurality of diverter walls extend in a generally radial direction relative to a center axis of the cone, and wherein the diverter walls are circumferentially spaced apart from each other about the center axis.

8. The mixer according to claim 1 wherein the diverter includes at least one scoop portion having a scoop inlet at the at least one first opening and a contoured wall portion that directs exhaust gas from the scoop inlet to the cone inlet opening.

9. The mixer according to claim 1 including a plurality of diverter walls wherein each diverter wall has a first edge directly connected to an inner surface of the diverter or the mixer housing and a second edge extending toward an outer surface of the cone to divide the diverter into a plurality of discrete flow passages.

10. A mixer for a vehicle exhaust system comprising:
a mixer housing defining an interior cavity to receive engine exhaust gases;
a doser opening formed within a wall of the mixer housing;
a cone having a cone inlet opening aligned with the doser opening and a cone outlet opening into the interior cavity; and
a diverter having at least one first opening that is open to the interior cavity and a second opening that surrounds the cone outlet, and wherein exhaust flow is directed by the diverter to the cone inlet opening to be mixed with a fluid injected through the doser opening, and wherein the diverter includes at least one scoop portion having a scoop inlet at the at least one first opening and a contoured wall portion that directs exhaust gas from the scoop inlet to the cone inlet opening, and wherein the at least one first opening comprises at least a scoop inlet opening at the scoop inlet and a window inlet opening that is separated from the scoop inlet opening such that the scoop inlet opening directs exhaust gas to one side of the cone inlet opening and the window inlet opening directs exhaust gas to an opposite side of the cone inlet opening.

11. The mixer according to claim 10 wherein the scoop inlet opening and the window inlet opening are co-planar.

12. The mixer according to claim 11 including at least one diverter wall having a first edge directly connected to an inner surface of the diverter or the mixer housing and a second edge extending to an outer surface of the cone to divide the diverter into at least two flow passages.

13. A mixer for a vehicle exhaust system comprising:
a mixer housing defining an interior cavity to receive engine exhaust gases;
a doser opening formed within a wall of the mixer housing;
a cone having a cone inlet opening aligned with the doser opening and a cone outlet opening into the interior cavity; and
a diverter having at least one first opening that is open to the interior cavity and a second opening that surrounds the cone outlet, and wherein exhaust flow is directed by the diverter to the cone inlet opening to be mixed with a fluid injected through the doser opening, and wherein the diverter includes at least one scoop portion having a scoop inlet at the at least one first opening and a contoured wall portion that directs exhaust gas from the scoop inlet to the cone inlet opening, and wherein the at least one scoop portion comprises at least a first scoop portion and a second scoop portion, and wherein the first scoop portion has a first scoop inlet at the at least one first opening and a first contoured wall portion that directs exhaust gas from the first scoop inlet to the cone inlet opening, and wherein the second scoop portion has a second scoop inlet at the at least one first opening and a second contoured wall portion that directs exhaust gas from the second scoop inlet to the cone inlet opening.

14. The mixer according to claim 13 wherein the at least one first opening comprises at least a first scoop inlet opening at the first scoop inlet and a second scoop inlet opening at the second scoop inlet such that the first scoop portion directs exhaust gas to one side of the cone and the second scoop portion directs exhaust gas to an opposite side of the cone.

15. The mixer according to claim 14 wherein the at least one first opening further includes a window inlet opening that is positioned between the first and second scoop inlet openings such that the window inlet opening directs exhaust gas to a portion of the cone inlet opening that is between the first and second scoop portions.

16. The mixer according to claim 15 including a plurality of diverter walls wherein each diverter wall has a first edge directly connected to an inner surface of the diverter or the mixer housing and a second edge extending toward an outer surface of the cone to divide the diverter into at least three discrete flow passages comprising a first flow passage for the first scoop portion, a second flow passage for the second scoop portion, and third flow passage for the window inlet opening.

17. The mixer according to claim 16 wherein the at least one first opening comprises a single opening formed within one of the plurality of diverter walls, and wherein at least two diverter walls of the plurality of diverter walls extend from the outer surface of the cone to the one of the plurality of diverter walls such that the single opening cooperates with the at least two diverter walls to define the window inlet opening and the first and second scoop inlet openings within a common plane.

18. A mixer for a vehicle exhaust system comprising:
a cone having a cone inlet opening configured to receive a fluid injected by a doser and a cone outlet;
a diverter comprising a duct body having a generally flat base portion that includes a cone opening at the cone outlet that extends at least partially around the cone outlet in a circumferential direction and a wall portion that extends outwardly from the base portion about at least a portion of a periphery of the base portion, and wherein the duct body includes an inlet opening that is formed at least partially within the wall portion; and
at least one diverter wall having a first edge adjacent to an outer surface of the cone and extending away from the first edge to a second edge that cooperates with the diverter to divide the diverter into a plurality of discrete flow passages, wherein exhaust gas flow enters the inlet opening and flows through the flow passages to the cone inlet opening to be mixed with the fluid injected by the doser.

19. The mixer according to claim 18 wherein the inlet opening of the duct body cooperates with one or more diverter walls to sub-divide the inlet opening into a discrete inlet opening for each discrete flow passage, and wherein the discrete inlet openings are co-planar.

20. The mixer according to claim 19 wherein the duct body includes a single scoop portion having a scoop inlet at a first discrete opening and a contoured wall portion that directs exhaust gas from the scoop inlet through a first flow passage to one side of the cone inlet opening, and wherein the duct body includes a window inlet at a second discrete opening such that the window inlet directs exhaust gas though a second flow passage to an opposite side of the cone inlet opening.

21. The mixer according to claim 19 wherein the duct body includes a first scoop portion and a second scoop portion, and wherein the first scoop portion has a first scoop inlet at a first discrete opening and a first contoured wall portion that directs exhaust gas through a first flow passage to one portion of the cone inlet opening, and wherein the second scoop portion has a second scoop inlet at a second discrete opening and a second contoured wall portion that directs exhaust gas through a second flow passage to another portion of the cone inlet opening.

22. The mixer according to claim 21 wherein the at least one diverter wall comprises a plurality of diverter walls each having the first edge located immediately adjacent to the outer surface of the cone, and wherein the second edges of at least two diverter walls extend from the cone to the inlet opening of the duct body to form a window inlet as a third discrete opening that is positioned between the first and second discrete openings such that the third discrete opening directs exhaust gas through a third flow passage to a portion of the cone inlet opening that is between the first and second scoop portions.

23. The mixer according to claim 18 wherein at least a portion of the cone opening has a curved profile.

\* \* \* \* \*